United States Patent
Igarashi

(10) Patent No.: US 10,834,402 B2
(45) Date of Patent: Nov. 10, 2020

(54) QUANTIZATION DEVICE, METHOD, AND RECORDING MEDIUM FOR PARALLEL PROCESSING TRANSFORM COEFFICIENTS

(71) Applicant: NEC Corporation, Tokyo (JP)

(72) Inventor: Hiroaki Igarashi, Tokyo (JP)

(73) Assignee: NEC CORPORATION, Tokyo (JP)

(\*) Notice: Subject to any disclaimer, the term of this patent is extended or adjusted under 35 U.S.C. 154(b) by 0 days.

(21) Appl. No.: 16/478,205

(22) PCT Filed: Jan. 17, 2018

(86) PCT No.: PCT/JP2018/001156
§ 371 (c)(1),
(2) Date: Jul. 16, 2019

(87) PCT Pub. No.: WO2018/135520
PCT Pub. Date: Jul. 26, 2018

(65) Prior Publication Data
US 2019/0373262 A1 Dec. 5, 2019

(30) Foreign Application Priority Data
Jan. 20, 2017 (JP) ................ 2017-008303

(51) Int. Cl.
*H04N 19/124* (2014.01)
*H04N 19/176* (2014.01)
(Continued)

(52) U.S. Cl.
CPC ........ *H04N 19/124* (2014.11); *H04N 19/176* (2014.11); *H04N 19/436* (2014.11); *H04N 19/46* (2014.11)

(58) Field of Classification Search
None
See application file for complete search history.

(56) References Cited

U.S. PATENT DOCUMENTS 4,293,920 A \* 10/1981 Merola ............... G06G 7/22
375/240.18
9,635,366 B2 \* 4/2017 Matsumura ........... H04N 19/18
(Continued)

FOREIGN PATENT DOCUMENTS

JP 2015050608 A 3/2015
JP 2016134860 A 7/2016

OTHER PUBLICATIONS

D. Horn, "GPU Gems 2" NVIDIA Developer, Chapter 36, https://developer.nvidia.com/gpugems/GPUGems2/gpugems2_inside_front_cover.html, pp. 1-15 (15 pages total), retrieved on Jul. 19, 2019.
M. Harris et al., "GPU Gems 3" Parallel Prefix sum (scan) with CUDA, Chapter 39, "https://developer.nvidia.com/gpugems/GPUGems3/gpugems3_pref01.html", pp. 1-18 (18 pages total), retrieved on Jul. 19, 2019.
Hoyoung Lee et al., "Fast Quantization Method With Simplified Rate-Distortion Optimized Quantization for an HEVC Encoder", IEEE Transactions on Circuits and Systems for Video Technology, vol. 26, No. 1, Jan. 1, 2016, pp. 107-116 (10 pages total).
(Continued)

*Primary Examiner* — Tyler W. Sullivan

(57) ABSTRACT

This quantization device includes a processor configured to calculate first costs in a plurality of data length candidates in consideration of the compression ratio and image quality deterioration due to compression of an image. The cost calculation processing is common processing partially performed among the plurality of data length candidates. The processor is configured to perform the common processing for the plurality of data length candidates, execute the distributed processes in parallel, and determine, as an optimal data length, a single data length for which a minimum cost is calculated among the first costs of the plurality of data length candidate.

11 Claims, 17 Drawing Sheets

(51) Int. Cl.
*H04N 19/436* (2014.01)
*H04N 19/46* (2014.01)

(56) References Cited

U.S. PATENT DOCUMENTS

| | | | | |
|---|---|---|---|---|
| 10,171,809 | B2* | 1/2019 | Yoneoka | H04N 19/18 |
| 2004/0240556 | A1* | 12/2004 | Winger | H04N 19/136 |
| | | | | 375/240.18 |
| 2013/0028329 | A1* | 1/2013 | Lou | H04N 19/122 |
| | | | | 375/240.18 |
| 2013/0051475 | A1* | 2/2013 | Joshi | H04N 19/129 |
| | | | | 375/240.18 |
| 2017/0064302 | A1* | 3/2017 | Na | H04N 19/147 |
| 2017/0310999 | A1* | 10/2017 | Hebel | H04N 19/147 |
| 2019/0191161 | A1* | 6/2019 | Gisquet | H04N 19/176 |

OTHER PUBLICATIONS

Yongfei Zhang et al., "Fast Rate Distortion Optimized Quantization for HEVC", Visual Communication and Image Processing (VCIP), 2015, pp. 1-4 ( 4 pages total).
K. McCann et al., "High efficiency video coding (HEVC) test model 16 (HM16) improved encoder description", Joint Collaborative Team on Video Coding (JCT-VC) of ITU-T SG16 WP3 and ISO/IEC JTC1/SC29/WG11, JCTVC-S1002, Oct. 2014, ( 54 pages total).
Written opinion of the international Searching Authority dated Apr. 3, 2018, in application No. PCT/JP2018/001156.
International Search Report dated Apr. 3, 2018, in counterpart International Application No. PCT/JP2018/001156.

* cited by examiner

Related Art

QUANTIZATION DEVICE, METHOD, AND RECORDING MEDIUM FOR PARALLEL PROCESSING TRANSFORM COEFFICIENTS

This application is a National Stage Entry of PCT/JP2018/001156 filed on Jan. 17, 2018, which claims priority from Japanese Patent Application 2017-008303 filed on Jan. 20, 2017, the contents of all of which are incorporated herein by reference, in their entirety.

TECHNICAL FIELD

The present invention relates to a quantization device, a quantization method, and a recording medium.

BACKGROUND ART

H.264/AVC (Advanced Video Codec) is widely used as a standard for compressing a video. Moreover, H.265/HEVC (High Efficiency Video Codec) is known as a next-generation video compression standard oriented toward compression of a high-resolution video such as 4K/8K pictures.

Such a video compression technology is composed of prediction processing, transformation/quantization processing, and entropy encoding. In the prediction processing, processing of reducing redundancy between frames or in a frame is performed. In the transformation/quantization processing, there is performed processing of reducing spatial redundancy by transforming a space component of a prediction residual signal into a frequency component and quantizing the frequency component. In the entropy encoding, there is performed processing of dynamically allocating variable-length encoding in response to an occurrence frequency of data.

In the transformation/quantization processing, a transform coefficient subjected to orthogonal transform and transformed into a frequency component is quantized, whereby an amount of information to be input to the entropy encoding can be reduced. Meanwhile, a quantization error occurs during the transformation/quantization processing, and accordingly, in a decoder, image quality degradation occurs in a decoded image at the time of decoding and reproducing a compressed and encoded image. In the HEVC, rate distortion optimization (RDO) is used at the time of making a selection considering such a trade-off relationship between the image quality degradation and reduction of a bit rate.

In the RDO, first, image quality degradation (D) and a bit rate (R) are derived in each selection. Then, in the RDO, RD cost is acquired by using the image quality degradation D and bit rate R, and a Lagrange multiplier λ. The RD cost J is represented by the following Equation (1).

[Math. 1]

$$J=D+\lambda R \quad (1)$$

As described above, in the RDO, an option with smaller RD cost is adopted, whereby higher encoding efficiency can be achieved.

In the quantization processing, rate distortion optimized quantization (RDOQ) is known as a technology for optimizing a quantized coefficient.

For example, NPL 1 describes reference software HM (HEVC Test Model) based on the HEVC standard, and discloses RDOQ composed of three pieces of processing which are quantization rounding error optimization, coefficient group (CG) optimization, and last coefficient position optimization.

In the quantization rounding error optimization, RD cost in a case of rounding up coefficient values divided by the quantization and RD cost in a case of rounding down the coefficient values are compared with each other, and an optimum coefficient value is adopted.

In the coefficient group (CG) optimization, quantized coefficients are evaluated for each of coefficient groups. Specifically, in the coefficient group optimization, it is evaluated whether the RD cost is improved when all coefficient values in each of the coefficient groups are 0, and the coefficient values are adopted when the RD cost is improved. Herein, the coefficient group is a unit of processing in the subsequent encoding processing. Meanwhile, in the transformation and the quantization, a unit of processing is a transform block.

FIG. 2 is a diagram illustrating a relationship between the transform block and the coefficient group. In the subsequent encoding processing, each coefficient value is encoded in a unit of the coefficient group. Hence, all coefficient values in the coefficient group are set to 0, whereby an amount of information to be encoded can be reduced greatly.

In the last coefficient position optimization, a highest-frequency coefficient (hereinafter, referred to as "last coefficient") to be encoded first is selected.

FIG. 3 is a diagram illustrating a state of binarization processing in the subsequent encoding processing. The quantized coefficients are binarized for each coefficient group in accordance with syntax. Herein, as illustrated in FIG. 2, the coefficients are processed, for example, in a diagonally upward right scanning order (hereinafter, referred to as "scanning order" or "encoding order"). Herein, the last coefficient is a coefficient that becomes non-zero first in the scanning order.

Moreover, the syntax includes position information of the last coefficient, and coefficient values after the last coefficient in the scanning order are encoded. Hence, a position of the last coefficient is shifted backward in the scanning order, whereby the bit rate can be reduced.

In the RDOQ, encoding efficiency is greatly improved by a series of optimization processing. Meanwhile, in the RDOQ, it is necessary to calculate RD cost regarding each selection candidate every time, and a calculation amount thereof is increased to a large extent. Moreover, in video encoding, a method of achieving acceleration by parallel processing is general, and in the RDOQ, it is necessary to calculate a rate at the time of calculating RD cost of each option. In the rate calculation, it is necessary to array the coefficient values in series, and to process the coefficient values in accordance with the syntax, and accordingly, it is difficult to perform the parallel processing.

PTL 1 describes a technology that solves such a problem. A coefficient absolute value determination unit described in PTL 1 approximates the number of bins relating to the syntax having a dependence relationship between the coefficients in the rate calculation. Herein, the number of bins represents the number of bits after the input is binarized in the encoding. The number of bins is an index to be generally used as approximation of the bit rate in the RDO simplification. The number of bins is used, and the coefficients having a dependence relationship therebetween are further approximated, whereby optimization of quantization rounding errors and optimization of the coefficient groups can be processed in parallel. Meanwhile, in optimization of the last coefficient position, it is difficult to calculate pieces of RD cost of the last coefficient position candidates in parallel even when approximation is used, and parallel processing thereof is difficult.

Likewise, PTL 2 describes a technology of performing parallel processing on quantization rounding errors in a unit of coefficient. For each of coefficient groups, a quantization device described in PTL 2 assumes that a higher-frequency coefficient group than a subject coefficient group, that is, a coefficient group located ahead in the scanning order is non-significant, and calculates the rate and the RD cost. By making such an assumption, the coefficient rounding error optimization, the coefficient group optimization, and the last coefficient position optimization are executable through a single-pass process. Moreover, the coefficient optimization unit approximates the rate calculation like the coefficient absolute value determination unit. By eliminating a dependence relationship between the coefficients, parallel processing for each of the coefficients is possible. Meanwhile, even when the technology described in PTL 2 is used, parallel processing for the last coefficient position optimization in a unit of coefficient is difficult. In such a case, the transform coefficient quantization cannot be processed efficiently, for example, when ultrafast parallel calculation such as general purpose computing on graphic processing unit (GPGPU) using a high parallel processor such as a graphic processing unit (GPU) is a purpose of use.

CITATION LIST

Patent Literature

PTL 1: Japanese Unexamined Patent Application Publication No. 2015-50608
PTL 2: Japanese Unexamined Patent Application Publication No. 2016-134860

Non Patent Literature

NPL 1: K. McCann, C. Rosewarne, B. Bross, M. Naccari, K. Sharman, G. Sullivan, JCTVC-S1002, "High efficiency video coding (HEVC) test model 16 (HM16) improved encoder description", October 2014
NPL 2: M. Harris, S. Sengupta, J. D. Owens, "GPU Gems 3", Chapter 39, "https://developer.nvidia.com/gpugems/GPUGems3/gpugems3_pref01.html"
NPL 3: D. Horn, "GPU Gems 2", Chapter. 36, "https://developer.nvidia.com/gpugems/GPUGems2/gpugems2_inside_front_cover.html"

SUMMARY OF INVENTION

Technical Problem

As mentioned above, the problem of the quantization device in the related art is that the last coefficient position optimization cannot be subjected to parallel processing in the RDOQ processing. In the last coefficient position optimization of the related art, it is necessary to update the last coefficient position candidates in an inverse scanning order, and to sequentially calculate the RD cost. Therefore, in a high-parallel architecture such as the GPU, quantization of the transform coefficients cannot be processed efficiently.

An object of the present invention is to provide a quantization device, a quantization method, and a quantization program, which solve the above-mentioned problem.

Solution to Problem

One of the present invention is a quantization device that performs quantization processing for an image. The quantization device according to the present invention includes processing means for calculating, for a plurality of data lengths, cost for which a degradation of image quality due to compression of the image and a compression ratio of the image are taken into consideration, wherein a processing of calculating the cost is a processing partially performed in common among the plurality of data lengths, and the processing means operates in parallel regarding the plurality of data lengths, and includes: cost calculating means for executing the processing performed in common among the plurality of data lengths in parallel while dispersing the processing; and determining means for acquiring, as an optimal data length, a single data length in which the cost becomes minimum among the plurality of data lengths.

One of the present invention is a quantization method of implementing quantization processing for an image by a quantization device. The quantization method includes calculating, for a plurality of data lengths, quantization cost for which a degradation of image quality due to compression of the image and a compression ratio of the image are taken into consideration, wherein the calculating the cost including a processing partially performed in common among the plurality of data lengths, and the calculating the cost comprising: executing the processing performed in common among the plurality of data lengths in parallel while dispersing the processing, and outputting, as an optimal data length, a single data length in which the cost becomes minimum among the plurality of data lengths.

One of the present invention is a non-transitory recording medium that records a quantization program causing a computer to perform quantization processing for an image. The quantization program causes the computer to execute processing of calculating, for a plurality of data lengths, cost for which a degradation of image quality due to compression of the image and a compression ratio of the image are taken into consideration, wherein the processing of calculating the cost includes a processing partially performed in common among the plurality of data lengths, and includes cost calculation processing of executing the processing performed in common among the plurality of data lengths in parallel while dispersing the processing; and determination processing of acquiring, as an optimal data length, a single data length in which the cost becomes minimum among the plurality of data lengths.

Advantageous Effects of Invention

According to the present invention, the number of steps related to optimization of data length is reduced, and optimization processing of the data length can be accelerated.

EXAMPLE EMBODIMENT

Background Art

In order to facilitate the understanding of the present invention, the background art will be described first.

Figure 1:
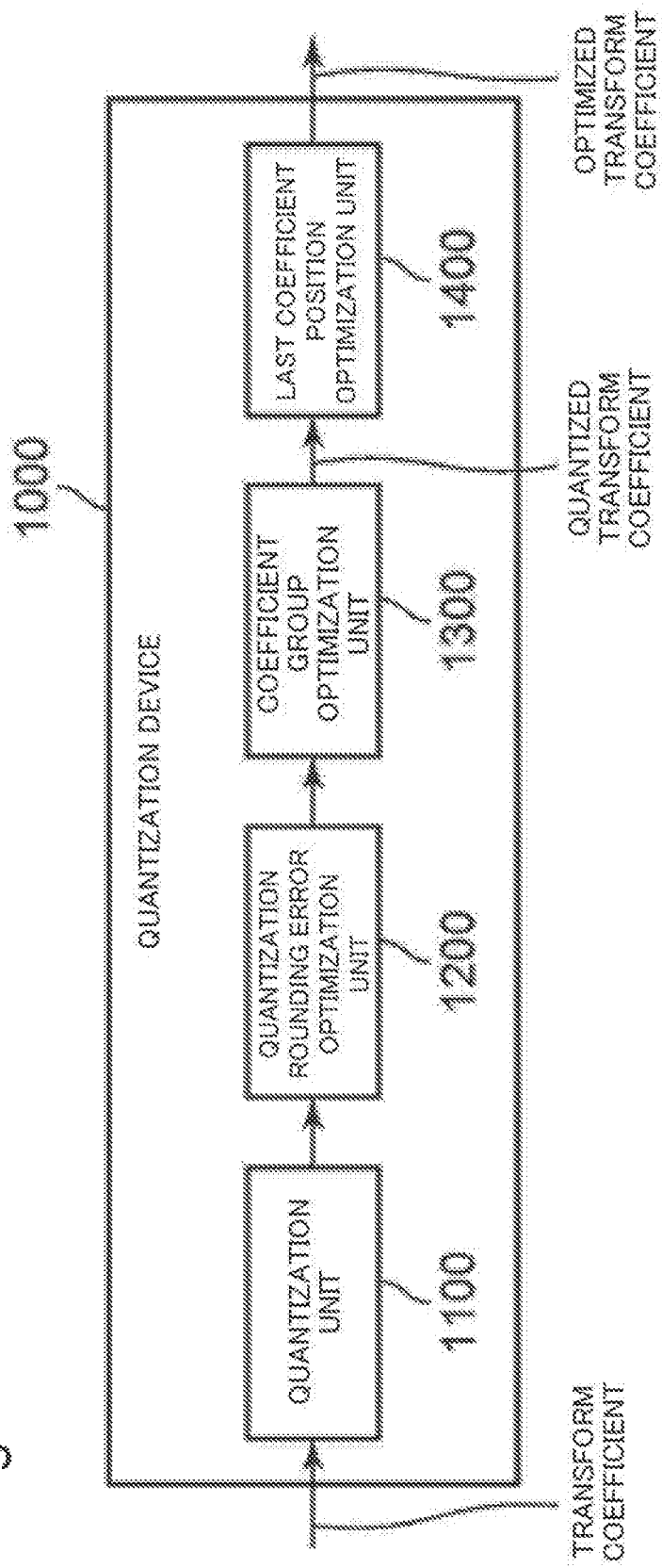
FIG. 1 is a block diagram illustrating a quantization device 1000 described in NPL 1.
Figure 2:
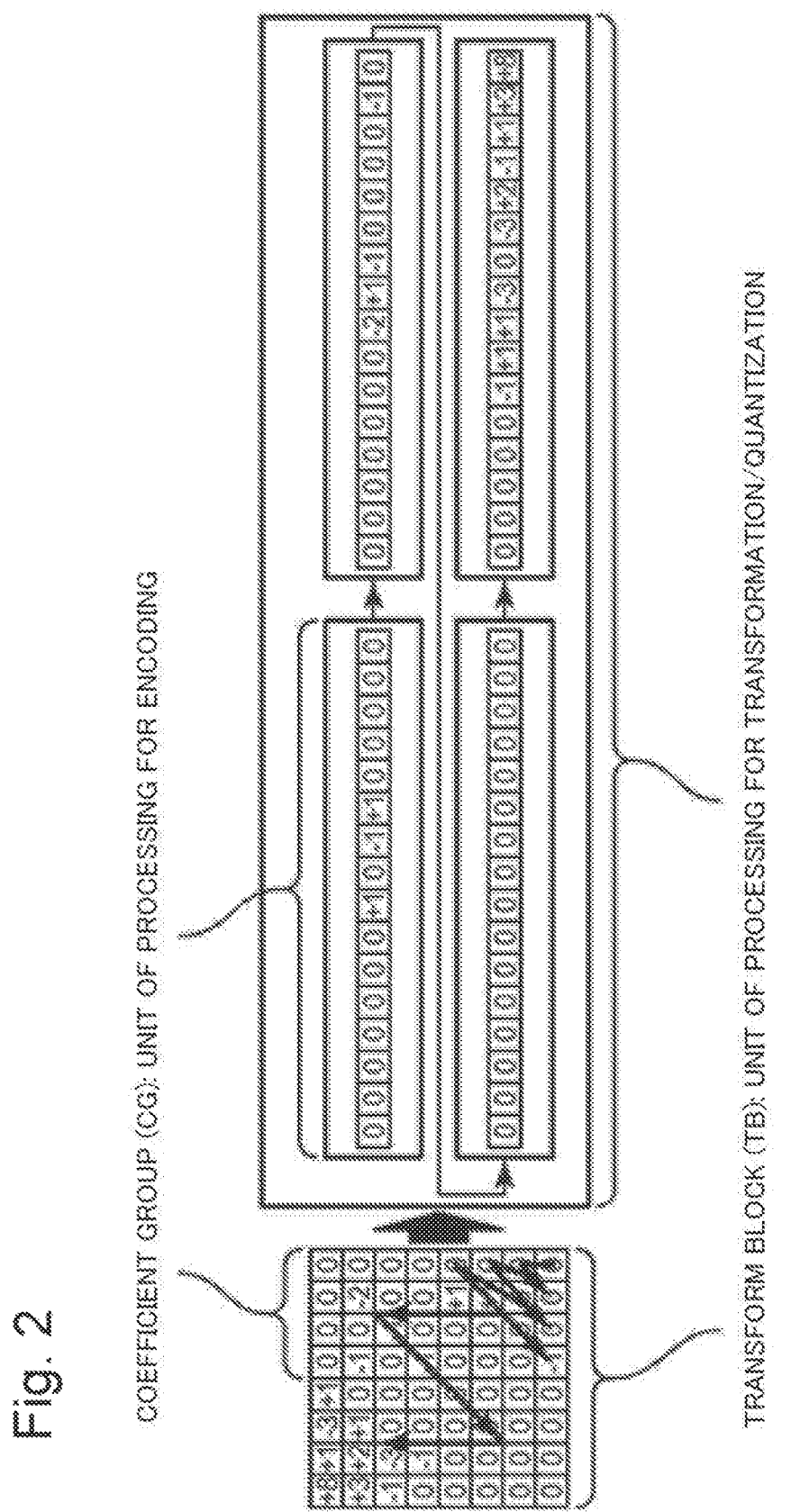
FIG. 2 is an explanatory diagram illustrating a relationship between a transform block and coefficient groups and a processing order thereof.
Figure 3:
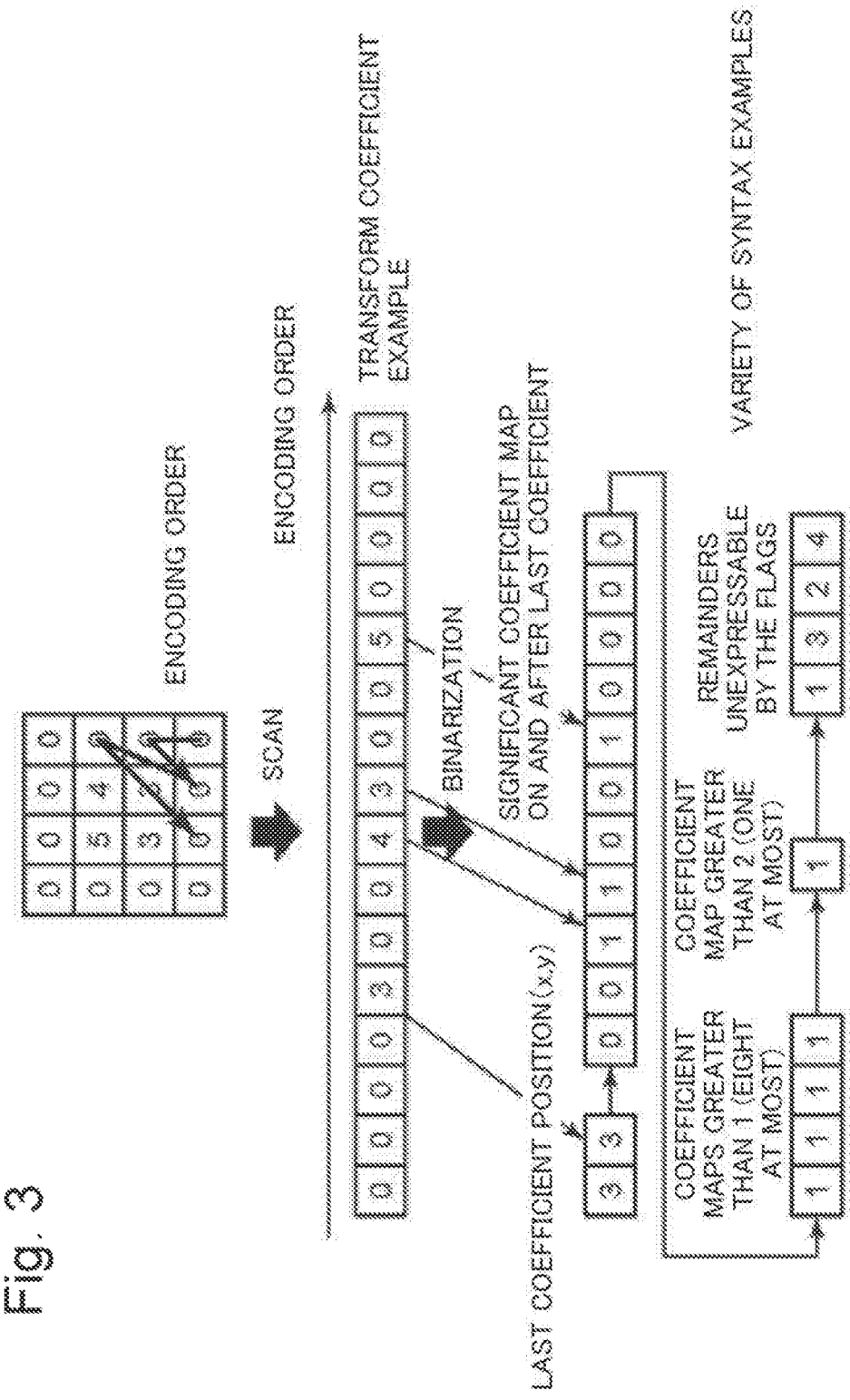
FIG. 3 is an explanatory diagram illustrating a state of binarization in HEVC.

FIG. 1 is a block diagram illustrating a configuration of a quantization device 1000 disclosed in NPL 1. The quantization device 1000 performs quantization processing of quantizing a transform coefficient acquired by transforming an image or a pixel value of the image.

The quantization device 1000 is composed of: a quantization unit 1100; a quantization rounding error optimization unit 1200; a coefficient group optimization unit 1300; and a last coefficient position optimization unit 1400.

The quantization unit 1100 quantizes a transform coefficient in accordance with a standard for compressing a video. For example, in the HEVC, quantization processing can be represented by the following Equation (2).

[Math. 2]

$$q_i = \text{Int}\left[\frac{c_i}{Q_{step}}\right] \quad (2)$$

$$Q_{step} = \frac{m_i \cdot 2^{qbit}}{Q_{scale}(qP \,\%6)}$$

$$qbit = 25 + \frac{qP}{6} - BitDepth - \log_2 N$$

$$Q_{scale}[6] = \{26214, 23302, 20560, 19306, 16384, 14564\}$$

Herein, $q_i$ represents an i-th coefficient, and $c_i$ represents an i-th quantized coefficient. Moreover, $m_i$ represents a quantization weighting coefficient, qP represents a quantization parameter, BitDepth represents a pixel bit precision of an input signal, and N represents a size of the transform block (TB). The symbol "%" represents modulo. Herein, the transform block is a unit of processing for the transformation and the quantization.

The quantization rounding error optimization unit 1200 implements the above-mentioned quantization rounding error optimization.

The coefficient group (CG) optimization unit 1300 implements the above-mentioned coefficient group optimization.

The last coefficient position optimization unit 1400 implements the above-mentioned last coefficient position optimization. An operation of the last coefficient position optimization unit 1400 will be described below.

The last coefficient position optimization unit 1400 selects non-zero coefficient values as the last coefficient position candidates sequentially in the scanning order, and acquires the pieces of RD cost. At this time, coefficients before the last coefficient are not encoded, and accordingly, the last coefficient position optimization unit 1400 treats, as zero, all the coefficients located before the last coefficient position candidates in the scanning order. The last coefficient position optimization unit 1400 compares the RD cost of the respective last coefficient position candidates with one another, and selects an optimal last coefficient position.

In other words, the last coefficient position optimization unit 1400 works as a processing unit that optimizes a degradation of image quality due to compression and a compression ratio by cost calculation and determines an optimal data length.

In the RDOQ, the encoding efficiency can be greatly improved by a series of such optimization processing as described above. Meanwhile, in the RDOQ, it is necessary to calculate the RD cost regarding each selection candidate every time, and the calculation amount is increased to a large extent. Moreover, in the video encoding, a method of achieving acceleration by parallel processing is general, and in the RDOQ, it is necessary to calculate a rate at the time of calculating the RD cost of each option. In the rate calculation, it is necessary to array the respective coefficient values in series, and to process these in accordance with syntax, and accordingly, it is difficult to perform the parallel processing.

Figure 4:
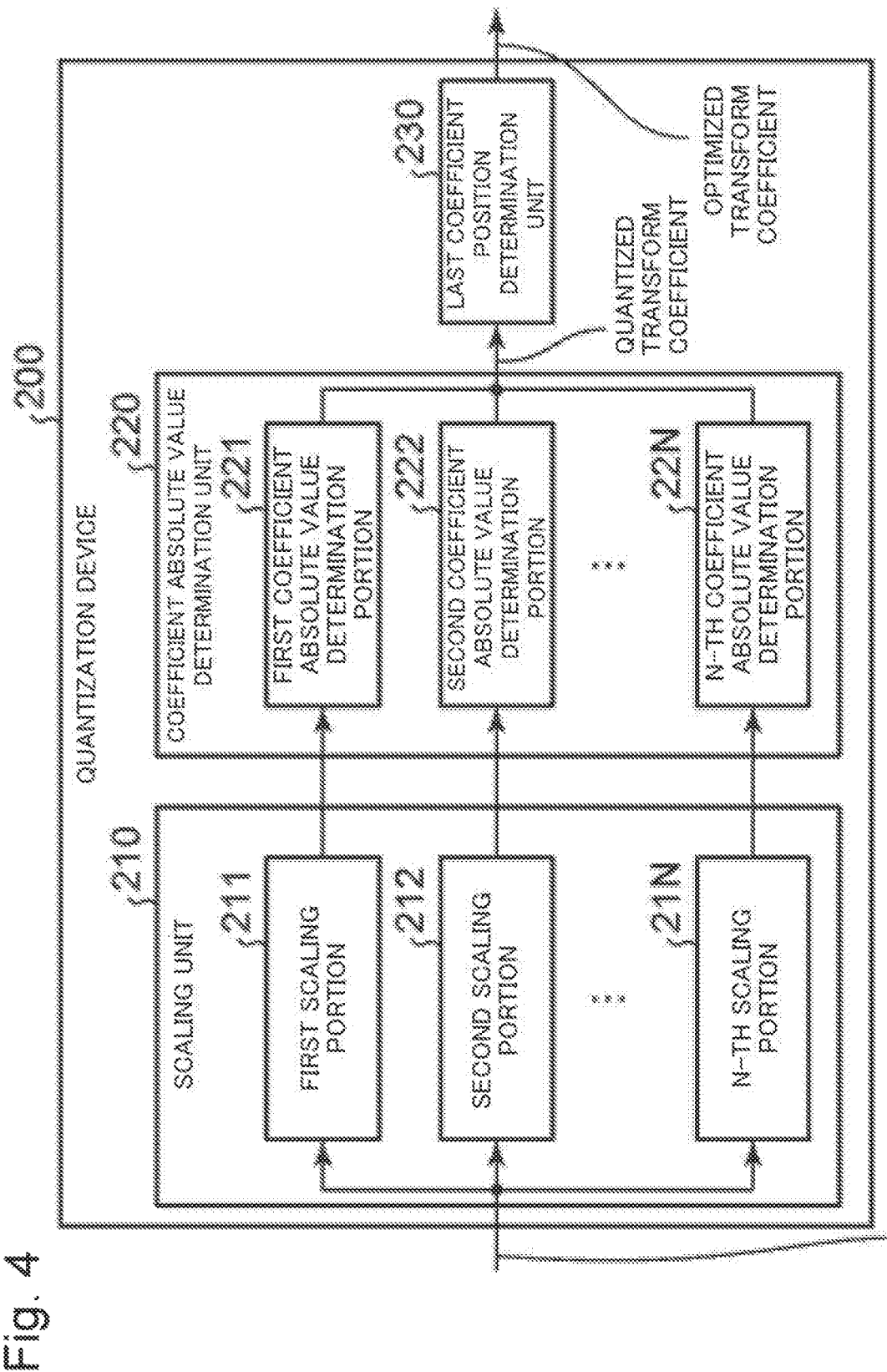
FIG. 4 is a block diagram illustrating a quantization device 200 described in PTL 1.

FIG. 4 is a block diagram illustrating a configuration of a quantization device 200 using the technology described in PTL 1.

The quantization device 200 is composed of: a scaling unit 210; a coefficient absolute value determination unit 220; and a last coefficient position determination unit 230.

The scaling unit 210 includes first to N-th scaling portions 211, 212, ..., 21N, which respectively perform scaling for first to N-th transform coefficients $C_1$ to $C_N$ of a target block. Herein, N is an integer of 2 or more. Herein, the target block is a unit of processing where orthogonal transform is performed for a prediction residual signal that is a difference between an input image and a prediction image. The input image is an image that constitutes a video. The prediction image is an image generated by intra prediction, motion compensation prediction, or the like.

The coefficient absolute value determination unit 220 includes first to N-th coefficient absolute value determination portions 221, 222, ..., 22N, which respectively determine coefficient absolute values of first to N-th quantization coefficients $P_1$ to $P_N$ acquired by quantizing scaling results of the first to N-th transform coefficients $C_1$ to $C_N$.

The last coefficient position determination unit 230 determines a last coefficient position of the target block on the basis of the coefficient absolute values of the first to N-th quantization coefficients $P_1$ to $P_N$ determined by the coefficient absolute value determination unit 220.

The coefficient absolute value determination unit 220 approximates the number of bins relating to the syntax having a dependence relationship between the coefficients in the rate calculation. Herein, the number of bins represents the number of bits after the input is binarized in the encoding. The number of bins is an index to be generally used as approximation of the bit rate in the RDO simplification. The number of bins is used, and further, the coefficients having a dependence relationship therebetween are approximated, whereby the optimization of the quantization rounding errors and the optimization of the coefficient groups can be processed in parallel.

Meanwhile, in the optimization of the last coefficient position in the last coefficient position determination unit 230, it is difficult to calculate the pieces of RD cost of the respective last coefficient position candidates in parallel even when the approximation is used, and the parallel processing thereof is difficult.

Figure 5:
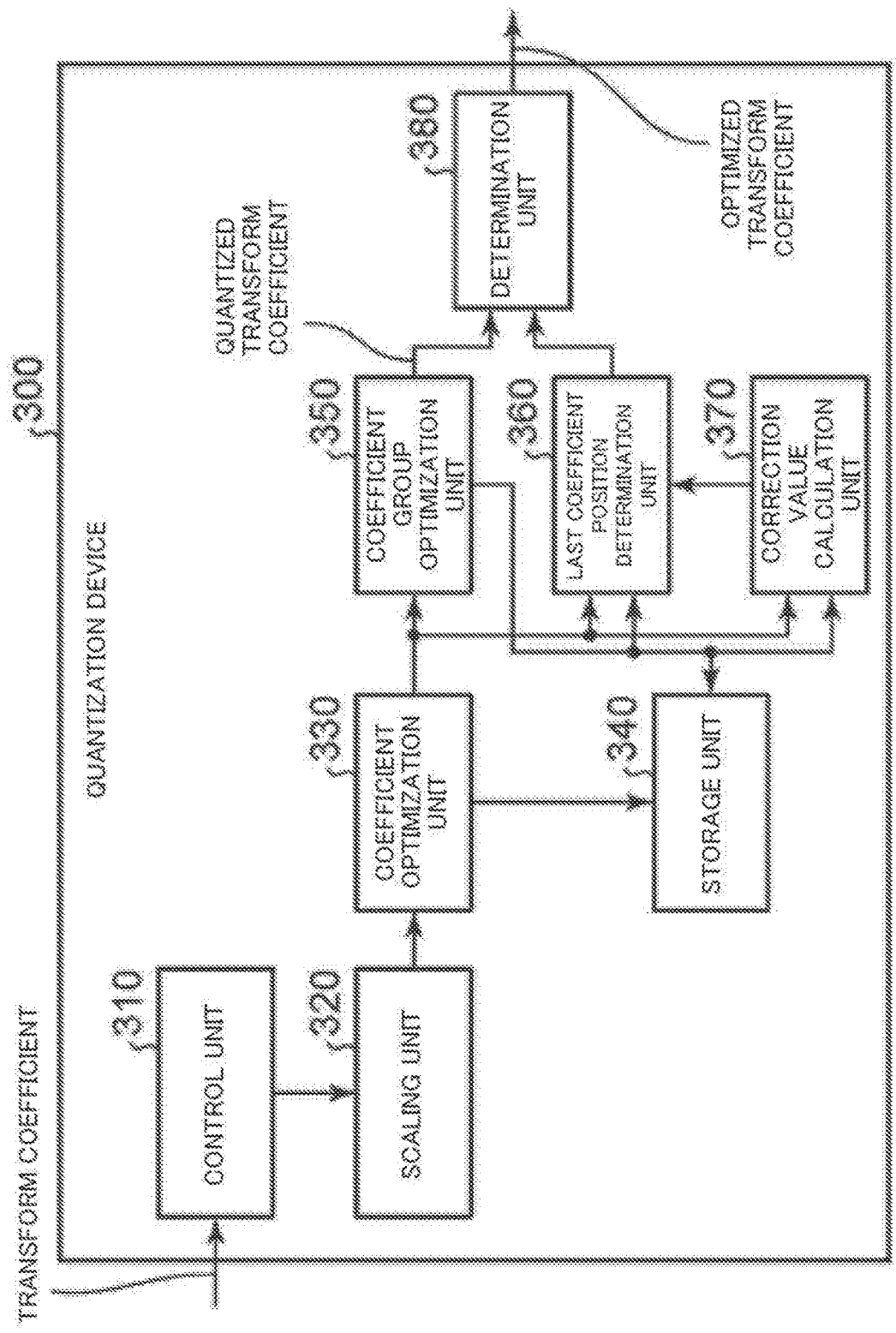
FIG. 5 is a block diagram illustrating a quantization device 300 described in PTL 2.

FIG. 5 is a block diagram illustrating a configuration of a quantization device 300 using the technology described in PTL 2.

The quantization device 300 includes: a control unit 310; a scaling unit 320; a coefficient optimization unit 330; a storage unit 340; a coefficient group optimization unit 350; a last coefficient position determination unit 360; a correction value calculation unit 370; and a determination unit 380.

The control unit 310 is an example of a division unit, and divides a transfer unit (TU), in which the orthogonal transform coefficient is calculated, in the unit of coefficient group every time when the TU is input. Note that the TU is a block serving as a unit of the orthogonal transform. The control unit 310 passes the coefficient groups to the scaling unit 320 in order from a low frequency side.

Every time when the coefficient group is input, the scaling unit 320 creates a list of candidates for the quantization coefficients, which are values acquired by quantizing orthogonal transform coefficients included in the coefficient group, for each of the orthogonal transform coefficients. The scaling unit 320 passes, to the coefficient optimization unit 330, the candidates for the quantization coefficients regarding the respective orthogonal transform coefficients included in the coefficient group.

Regarding the respective orthogonal transform coefficients included in the coefficient groups, the coefficient optimization unit 330 specifies, for each of the coefficient groups, a candidate in which the RD cost becomes minimum from among the candidates for the quantization coefficients corresponding thereto, and defines the specified candidate as a quantization coefficient for the orthogonal transform coefficient.

The coefficient optimization unit 330 stores each of such acquired quantization coefficients in the storage unit 340, and passes this quantization coefficient to the coefficient group optimization unit 350, the correction value calculation unit 370, and the last coefficient position determination unit 360. The coefficient optimization unit 330 also stores, in the storage unit 340, an encoding error calculated for 0 that is one of the candidates for the quantization coefficients regarding the respective orthogonal transform coefficients.

For each of the coefficient groups, the coefficient group optimization unit 350 determines whether to set the quantization coefficients included in the coefficient group to 0, in order from the low frequency side.

The coefficient group in which the last coefficient is included is not a target of the coefficient group optimization, and accordingly, the coefficient group optimization unit 350 assumes that the last coefficient is present on a higher frequency side than the coefficient group of interest. Then, the coefficient group optimization unit 350 calculates: RD cost CGCost(m) of the whole of the coefficient group of interest when the quantization coefficients in the coefficient group are maintained; and RD cost CGCost0(m) of the whole of the coefficient group of interest when 0 is substituted for all the quantization coefficients in the coefficient group.

For the coefficient group of interest, when CGCost0(m) is smaller than CGCost(m), the coefficient group optimization unit 350 determines to substitute 0 for the quantization coefficients included in the coefficient group. Meanwhile, when CGCost0(m) is equal to or more than CGCost(m), the coefficient group optimization unit 350 determines to maintain the quantization coefficients included in the coefficient group. Then, the coefficient group optimization unit 350 stores, in the storage unit 340, a flag indicating a result of the determination, and notifies the determination unit 380 of the determination result.

The correction value calculation unit 370 calculates a correction value of the RD cost, which is to be used for RD cost comparison between the coefficient groups, for each of the coefficient groups.

The correction value calculation unit 370 calculates a correction value regarding the coefficient group of interest, and passes the calculated correction value to the last coefficient position determination unit 360.

For each of the coefficient groups, in order from the low frequency side, the last coefficient position determination unit 360 assumes that the last coefficient is included in that coefficient group, and acquires the candidate for the last coefficient.

The last coefficient position determination unit 360 notifies the determination unit 380 of a position of the last coefficient and the RD cost of the entire TU corresponding to the position of the last coefficient.

The determination unit 380 compares the RD cost of the entire TU corresponding to the position of the last coefficient, which is acquired by the last coefficient position determination unit 360, and the RD cost at the time of substituting 0 for all the quantization coefficients included in the TU.

For each of the coefficient groups, the quantization device 300 described in PTL 2 assumes that higher-frequency coefficient groups than a subject coefficient group, that is, coefficient groups located ahead in the scanning order are non-significant, and calculates the rate and the RD cost. By making such an assumption, the coefficient rounding error optimization, the coefficient group optimization, and the last coefficient position optimization are executable through a single-pass process.

Moreover, the coefficient optimization unit 330 approximates the rate calculation like the coefficient absolute value determination unit 220 illustrated in FIG. 4. By eliminating the dependence relationship between the coefficients, the parallel processing for each of the coefficients is possible.

Meanwhile, even when the technology described in PTL 2 is used, it is difficult to perform the parallel processing for the last coefficient position optimization in the unit of coefficient. In such a case, the transform coefficient quantization cannot be processed efficiently, for example, when a purpose of use is for an ultrafast parallel calculation such as general purpose computing on a graphic processing unit (GPGPU) using a high parallel processor such as a graphic processing unit (GPU).

Figure 6:
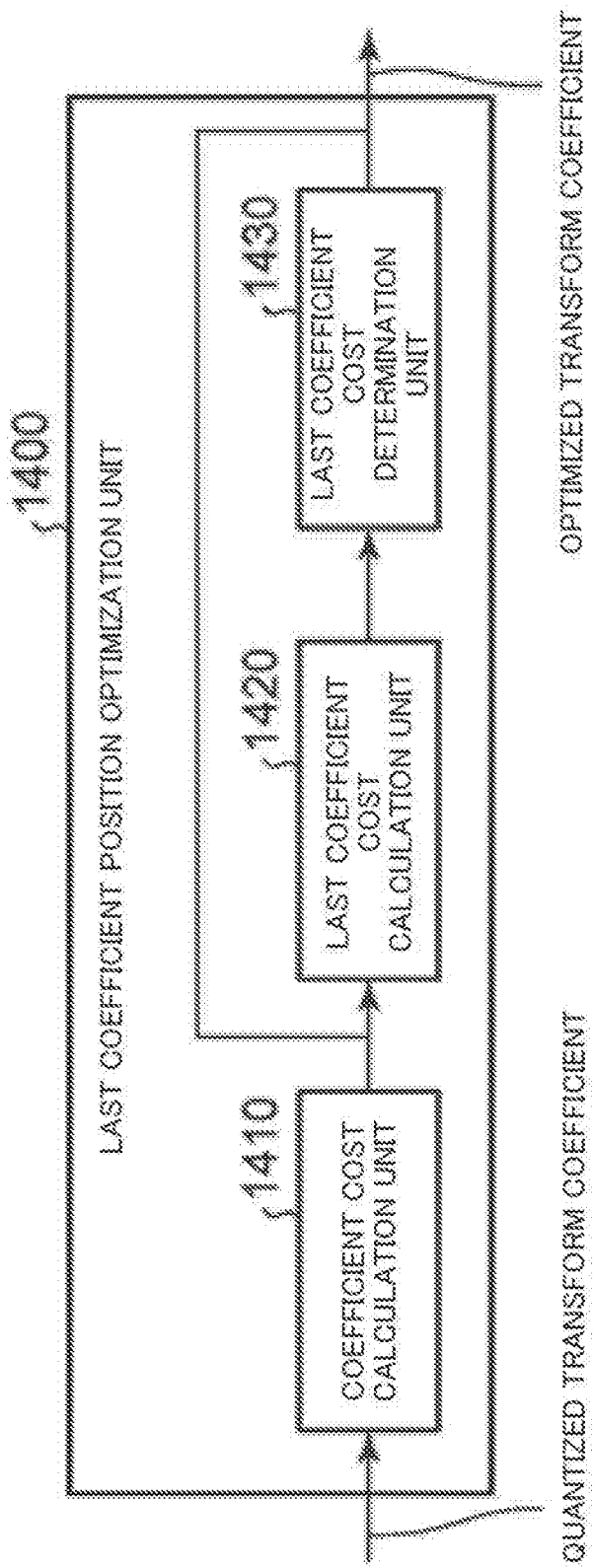
FIG. 6 is a block diagram illustrating a last coefficient position optimization unit 1400 described in NPL 1.

FIG. 6 is a block diagram illustrating a configuration of a last coefficient position optimization unit 1400 described in NPL 1.

The last coefficient position optimization unit 1400 receives a quantized transform coefficient subjected to quantization processing as an input, and outputs an optimized transform coefficient optimized regarding a last coefficient position.

The last coefficient position optimization unit 1400 is composed of: a coefficient cost calculation unit 1410; a last coefficient cost calculation unit 1420; and a last coefficient cost determination unit 1430.

The coefficient cost calculation unit 1410 receives the quantized transform coefficient as an input, and calculates cost when each transform coefficient is encoded and cost when each transform coefficient is not encoded. Note that RD cost when each transform coefficient is encoded and RD cost when each transform coefficient is not encoded can also be calculated by the quantization rounding error optimization unit 1200 (FIG. 1). In this case, the coefficient cost calculation unit 1410 can be omitted.

Subsequently, the last coefficient cost calculation unit 1420 calculates RD cost of a current last coefficient position candidate. Herein, for such last coefficient position candidates, the respective coefficients are sequentially set in the scanning order.

Note that the last coefficient position candidates are also called data length candidates. Hence, a combination of the coefficient cost calculation unit 1410 and the last coefficient cost calculation unit 1420 works as a cost calculation unit that calculates pieces of cost of the respective data length candidates sequentially (one by one).

The last coefficient cost determination unit 1430 has a function to hold an optimal last coefficient position. The last coefficient cost determination unit 1430 compares RD cost of the optimal last coefficient position candidate held currently and RD cost of the last coefficient position candidate calculated by the last coefficient cost calculation unit 1420 with, and selects a coefficient position with smaller RD cost as the optimal last coefficient position.

Hence, the last coefficient cost determination unit 1430 works as a determination unit that determines data length candidates with minimum cost from among a plurality of data length candidates sequentially (one by one), and acquires the optimal data length.

An RD cost calculation method of the last coefficient position candidates will be described below.

When a size of the TB is N, RD cost when a coefficient at an arbitrary coefficient position i is encoded is $J_{i,code}$, and RD cost when the coefficient is set to 0 is $J_{i,cut}$, then RD cost $J_{last=1}$ when the last coefficient position is 1 is represented by the following Equation (3).

[Math. 3]

$$J_{last=l} = \sum_{i=0}^{l-1} J_{i,cut} + \sum_{i=l}^{N-1} J_{i,code} \quad (3)$$

Moreover, a relationship between $J_{last=1}$ and $J_{last=1+1}$ can be represented by the following Equation (4).

[Math. 4]

$$J_{last=l+1} = \sum_{i=0}^{l-1} J_{i,cut} + \sum_{i=l+1}^{N-1} J_{i,code} = \\ \sum_{i=0}^{l-1} J_{i,cut} + \sum_{i=l}^{N-1} J_{i,code} + J_{i,cut} - J_{i,code} = J_{last=l} + J_{i,cut} - J_{i,code} \quad (4)$$

From Equation (4), it is seen that the RD cost of the last coefficient position l+1 just needs to be obtained by adding $J_{i,cut}$ to the RD cost $J_{last=1}$ at the last coefficient position l and subtracting $J_{i,code}$ therefrom. As described above, addition and subtraction are performed for the RD cost when the coefficient values of the last coefficient position candidates are encoded from the RD cost of the last coefficient position candidates and the RD cost when the coefficient values are not encoded. Thereby, the RD cost of the last coefficient position candidates coming next in the scanning order can be acquired.

Figure 7:
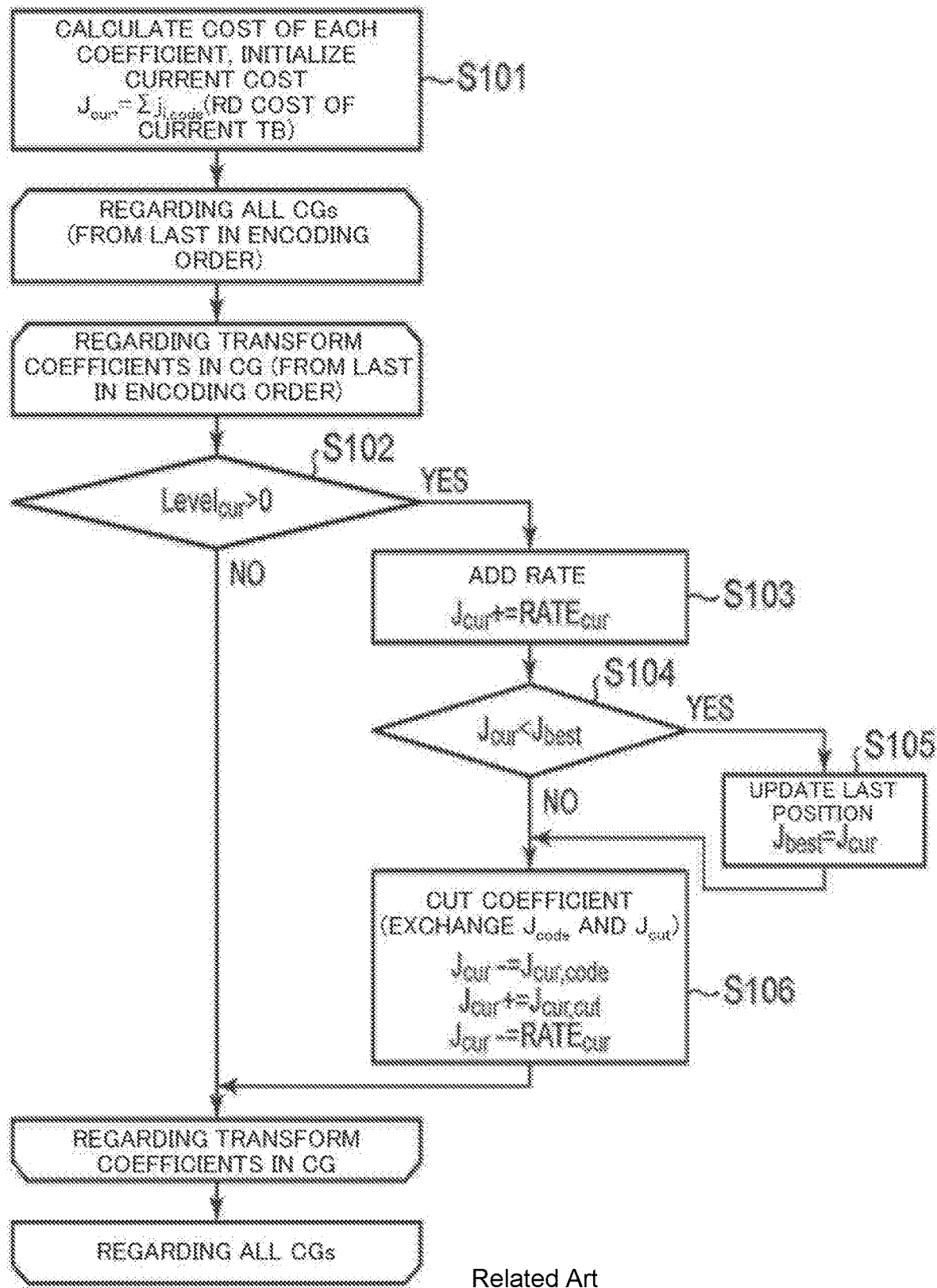
FIG. 7 is a flowchart illustrating last coefficient position optimization processing described in NPL 1.

FIG. 7 is a flowchart illustrating a flow of last coefficient position optimization processing described in NPL 1.

First, in the coefficient cost calculation unit 1410, there are calculated the RD cost when the respective coefficients are encoded (represented as $J_{i,code}$ in FIG. 7) and the RD cost when the respective coefficients are not encoded (represented as $J_{i,cut}$ in FIG. 7).

The last coefficient position optimization unit 1400 initializes the current RD cost (represented as $J_{cur}$ in FIG. 7) by the current cost of the TB, that is, the RD cost before the last coefficient position optimization (Step S101).

Hereinafter, the last coefficient position optimization unit 1400 sequentially processes coefficient blocks from a first coefficient block in the scanning order. Moreover, the last coefficient position optimization unit 1400 also sequentially processes coefficients in the coefficient blocks in the scanning order.

First, the last coefficient position optimization unit 1400 checks whether a last coefficient (represented as $Level_{cur}$ in FIG. 7) of current interest is non-zero (Step S102). When the last coefficient position of current interest is non-zero (YES in Step S102), the last coefficient position optimization unit 1400 proceeds to Step S103, and when the last coefficient position of current interest is zero (NO in Step S102), the last coefficient position optimization unit 1400 proceeds to processing regarding a next last coefficient position candidate.

When the last coefficient position of current interest is non-zero, the last coefficient cost calculation unit 1420 adds cost of the rate (represented as $RATE_{cur}$ in FIG. 7) to the current RD cost (represented as $J_{cur}$ in FIG. 7) (Step S103).

As the rate, the number of output bits of CABAC (Context-Adaptive Binary Arithmetic Coding), for example, is possible in the technology described in NPL 1; however, the rate may be approximated by using the number of bins before CABAC input as in the technologies described in PTL 1 and PTL 2. In comparison with the case of using the number of output bits of the CABAC, in the approximation, a precision of the acquired rate decreases, and the image quality or the bit rate is degraded.

Subsequently, the last coefficient cost determination unit 1430 checks whether the current RD cost (represented as $J_{cur}$ in FIG. 7) is improved more than the RD cost of the optimal last coefficient position candidate (represented as $J_{best}$ in FIG. 7) (Step S104). When the current RD cost is improved (YES in Step S104), the last coefficient cost determination unit 1430 proceeds to Step S105, and when the current RD cost is not improved (No in Step S104), the last coefficient cost determination unit 1430 proceeds to Step S106.

Subsequently, when the current RD cost is improved more than the RD cost of the optimal last coefficient position candidate (yes in Step S104), the last coefficient cost determination unit 1430 updates the optimal last coefficient position candidate (Step S105).

Subsequently, the last coefficient cost determination unit 1430 cuts the coefficient of current interest to zero before paying attention to the next last coefficient position candidate. Specifically, as in Equation (4), the last coefficient cost determination unit 1430 adds $J_{i,cut}$ to the current cost (represented as $J_{cur}$ in FIG. 7) and subtracts $J_{i,code}$ therefrom (Step S106).

In the same way, the last coefficient position optimization unit 1400 processes all the transform coefficients and all the coefficient groups.

As described above, the processing is started from l=0, and l is sequentially updated. In this way, the RD cost calculation for the respective last coefficient position candidates can be omitted, and the search for the last coefficient position candidates can be achieved by a smaller amount of calculation.

Meanwhile, in such a sequential algorithm, the parallel processing is difficult.

As mentioned above, the problem of the quantization devices 1000, 200, and 300 in the background art is that the last coefficient position optimization cannot be subjected to the parallel processing in the RDOQ processing. In the last coefficient position optimization unit 1400, the last coefficient position determination unit 230, and the last coefficient position determination unit 360 in the background art, it is necessary to update the last coefficient position candidates in the inverse scanning order, and to sequentially calculate the RD cost. Therefore, in a high-parallel architecture such as the GPU, the quantization of the transform coefficients cannot be processed efficiently.

Example embodiments of the present invention will be described below in detail with reference to the drawings. Configurations described in the following respective example embodiments are merely illustrative, and the technical scope of the present invention is not limited to these.

First Example Embodiment

[Explanation of Configuration]

Figure 8:
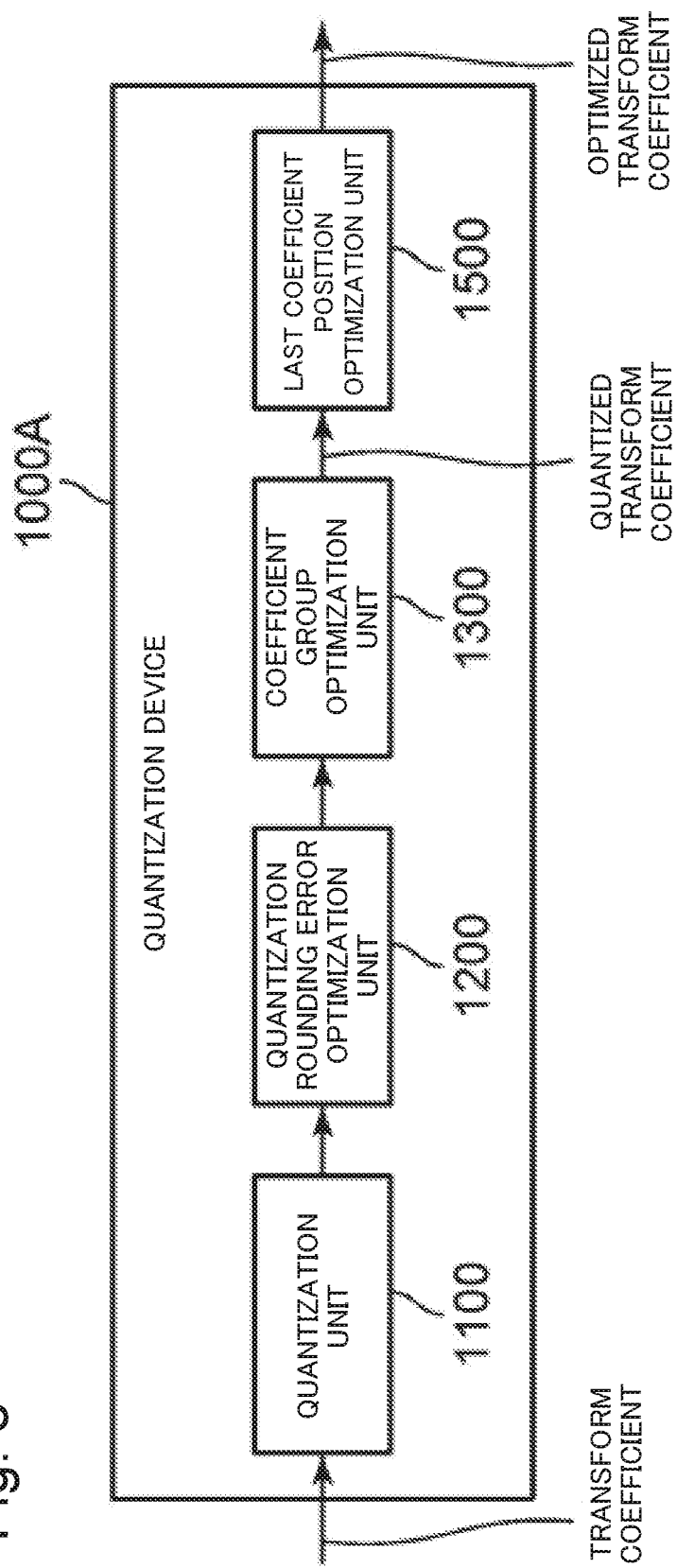
FIG. 8 is a block diagram illustrating a configuration of a quantization device 1000A of a first example embodiment of the present invention.

FIG. 8 is a block diagram illustrating a configuration example of a quantization device 1000A according to a first example embodiment of the present invention. The quantization device 1000A is a device that performs quantization processing of quantizing an image.

The illustrated quantization device 1000A has a similar configuration to that of the quantization device 1000 illustrated in FIG. 1 except that a last coefficient position optimization unit 1500 is used in place of the last coefficient position optimization unit 1400.

Figure 9:
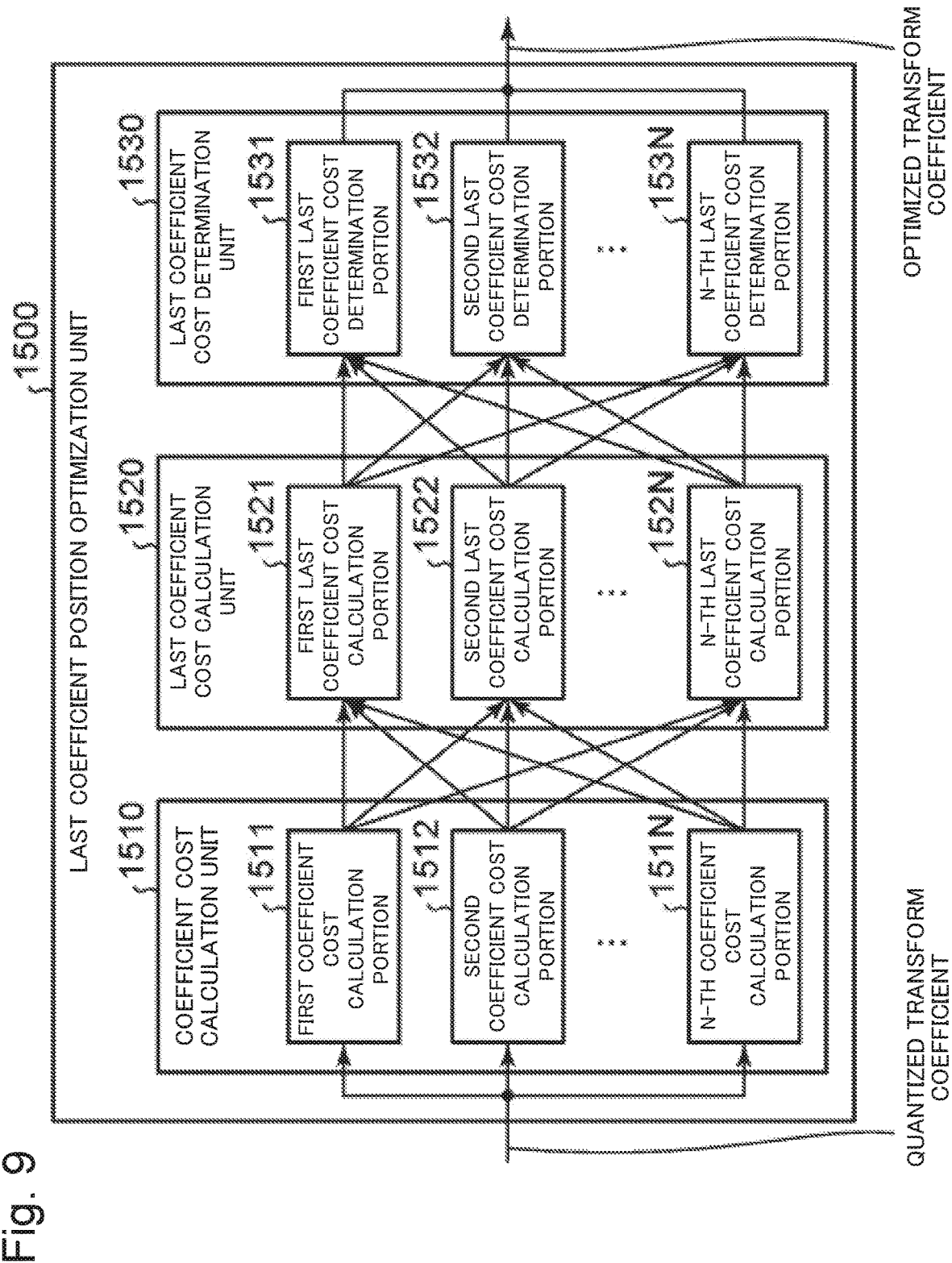
FIG. 9 is a block diagram illustrating a configuration of a last coefficient position optimization unit 1500 for use in the quantization device 1000A illustrated in FIG. 8.

FIG. 9 is a block diagram illustrating a configuration example of the last coefficient position optimization unit 1500 illustrated in FIG. 8. As will be described later, the last coefficient position optimization unit 1500 operates as a processing unit that acquires candidates for an output data length that minimizes cost to which a degradation of image quality due to compression and a compression ratio are taken into consideration, thereby determining an optimal data length to be output. Note that the processing of calculating the above-described cost is processing partially common to a plurality of data length candidates.

As illustrated in FIG. 9, the last coefficient position optimization unit 1500 of this first example embodiment is composed of: a coefficient cost calculation unit 1510; a last coefficient cost calculation unit 1520; and a last coefficient cost determination unit 1530.

The last coefficient position optimization unit 1500 of this first example embodiment receives the quantized transform coefficient as an input, and outputs a transform coefficient subjected to rate distortion optimal quantization processing (hereinafter, referred to as "optimized transform coefficient").

Moreover, the last coefficient position optimization unit 1500 of this first example embodiment is different from the last coefficient position optimization unit 1400 (FIG. 6) of the background art in that it is possible to perform parallel processing in the unit of each coefficient. Herein, "parallel processing in the unit of coefficient" refers to the matter that each processing unit includes N (N is an integer of 2 or more) pieces of processing units which accompany the same, where N is a maximum total number of the coefficients in the transform block. In other words, the respective coefficients in the transform block are processed in parallel in the respective processing units 1 to N. Moreover, though an example where the parallel number becomes maximum is illustrated herein, the parallel number may be reduced, and a plurality of the coefficients may be processed collectively by a single processing unit.

The coefficient cost calculation unit 1510 is composed of first to N-th coefficient cost calculation portions 1511, 1512, . . . , 151N. The coefficient cost calculation unit 1510 receives N pieces of quantized transform coefficients as an input, and calculates and outputs RD cost $J_{i,code}$ when the respective coefficients are encoded and RD cost $J_{i,cut}$ when the respective coefficients are not encoded. Herein, it is assumed that the dependence relationship between the coefficients is not present due to the approximation in the rate calculation. For example, the coefficient encoding can be simplified by using the number of bins as described in PTL 1 or PTL 2.

Moreover, like the coefficient cost calculation unit 1410 (refer to FIG. 6), the coefficient cost calculation unit 1510 is omittable when $J_{i,code}$ and $J_{i,cut}$ are calculated by the quantization rounding error optimization unit 1200 (refer to FIG. 8).

The last coefficient cost calculation unit 1520 is composed of first to N-th last coefficient cost calculation portions 1521, 1522, . . . , 152N. The last coefficient cost calculation unit 1520 inputs the RD cost $J_{i,code}$ when the respective coefficients acquired by the coefficient cost calculation unit 1510 are encoded and the RD cost $J_{i,cut}$ when the respective coefficients are not encoded thereby, and calculates and outputs, in parallel, the RD cost when the respective coefficients are set as the last coefficient positions.

In other words, a combination of the coefficient cost calculation unit 1510 and the last coefficient cost calculation unit 1520 works as a cost calculation unit that calculates pieces of cost of the plurality of data length candidates in parallel while dispersing a common calculation.

The last coefficient cost determination unit 1530 is composed of first to N-th last coefficient cost determination portions 1531, 1532, . . . , 153N. The last coefficient cost determination unit 1530 inputs the RD cost when the respective coefficients acquired by the last coefficient cost calculation unit 1520 are set as the last coefficient positions, and determines in parallel a minimum value thereof, that is, an optimal last coefficient position. Moreover, when the last coefficient positions are located before an assigned coefficient in the scanning order, the last coefficient cost determination unit 1530 sets the assigned coefficient to zero, and outputs a quantized transform coefficient optimized regarding the last coefficient positions.

In other words, the last coefficient cost determination unit 1530 works as a determination unit that determines, in parallel, a single data length candidate with minimum cost among a plurality of data length candidates, and acquires the optimal data length.

Hence, the last coefficient position optimization unit 1500 operates in parallel regarding the plurality of data length candidates.

[Explanation of Operations]

Next, an operation of the last coefficient position optimization unit 1500 of this first example embodiment will be described in detail with reference to a flowchart of FIG. 10 and an explanatory diagram of FIG. 11.

Figure 11:
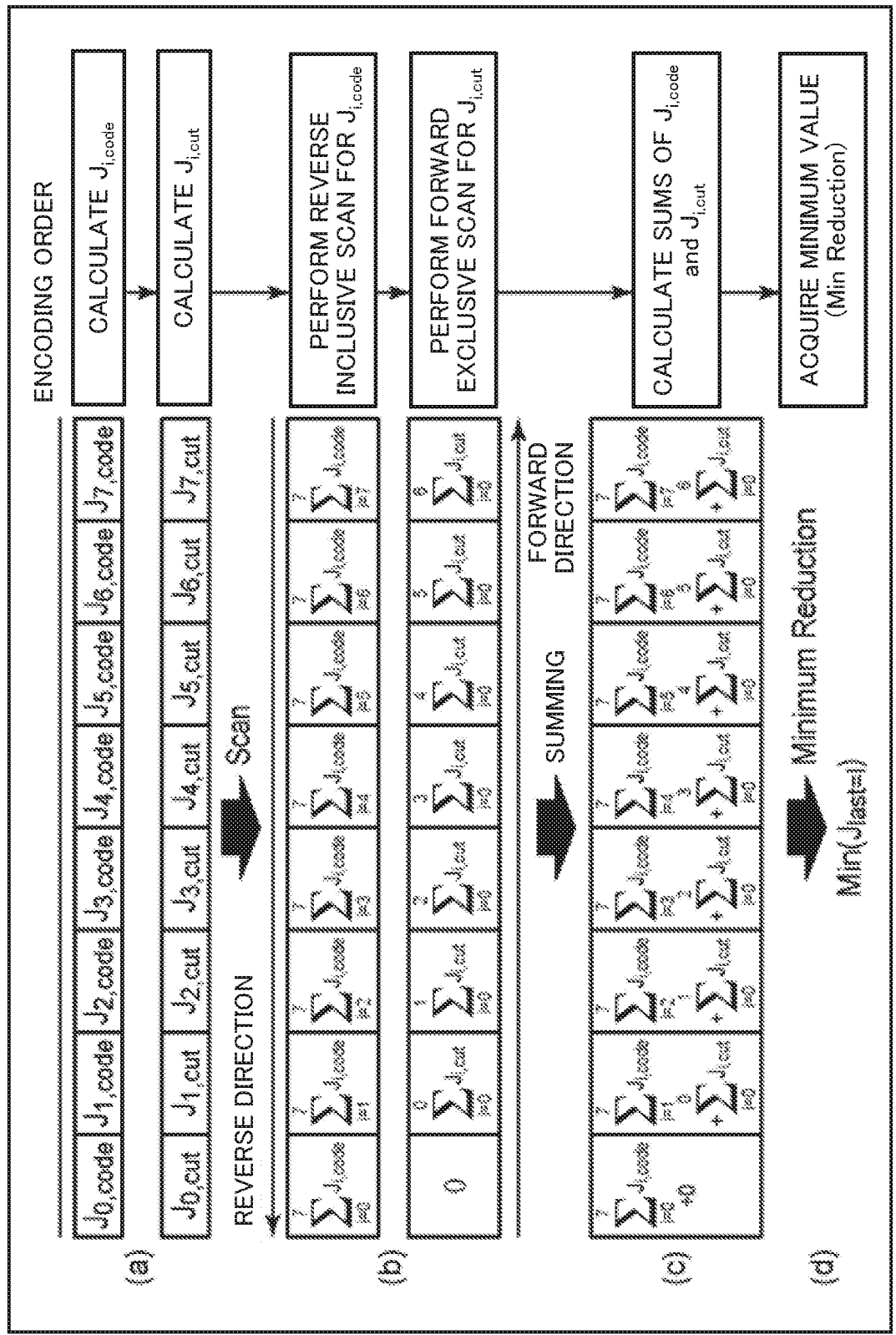
FIG. 11 is an explanatory diagram illustrating a state of cost calculation of a last coefficient position by the present invention.

First, the coefficient cost calculation unit 1510 calculates the RD cost $J_{i,code}$ when the respective coefficients are encoded and the RD cost $J_{i,cut}$ when the respective coefficients are not encoded (Step S201, corresponding to (a) in the explanatory diagram of FIG. 11).

Note that $J_{i,code}$ and $J_{i,cut}$ are assumed to be those acquired by approximating the number of bins, for example, so as to eliminate the dependence relationship between the coefficients. In the case of not using the approximation, it is necessary to separately calculate rates relating to the encoding of the syntax in which the dependence relationship is present between the coefficients, and to add the calculated rates to one another. As approximation methods, the technologies described in PTL 1 and PTL 2 are possible, for example. The approximation makes it possible to achieve the parallel processing for each of the coefficients.

Subsequently, the last coefficient cost calculation unit 1520 calculates cost of the respective last coefficient position candidates. Specifically, first, the last coefficient cost calculation unit 1520 performs forward exclusive scan and reverse inclusive scan for the $J_{i,cut}$ and $J_{i,code}$, which are acquired by the coefficient cost calculation unit 1510 (Step S202, corresponding to (b) in the explanatory diagram of FIG. 11).

Figure 12:
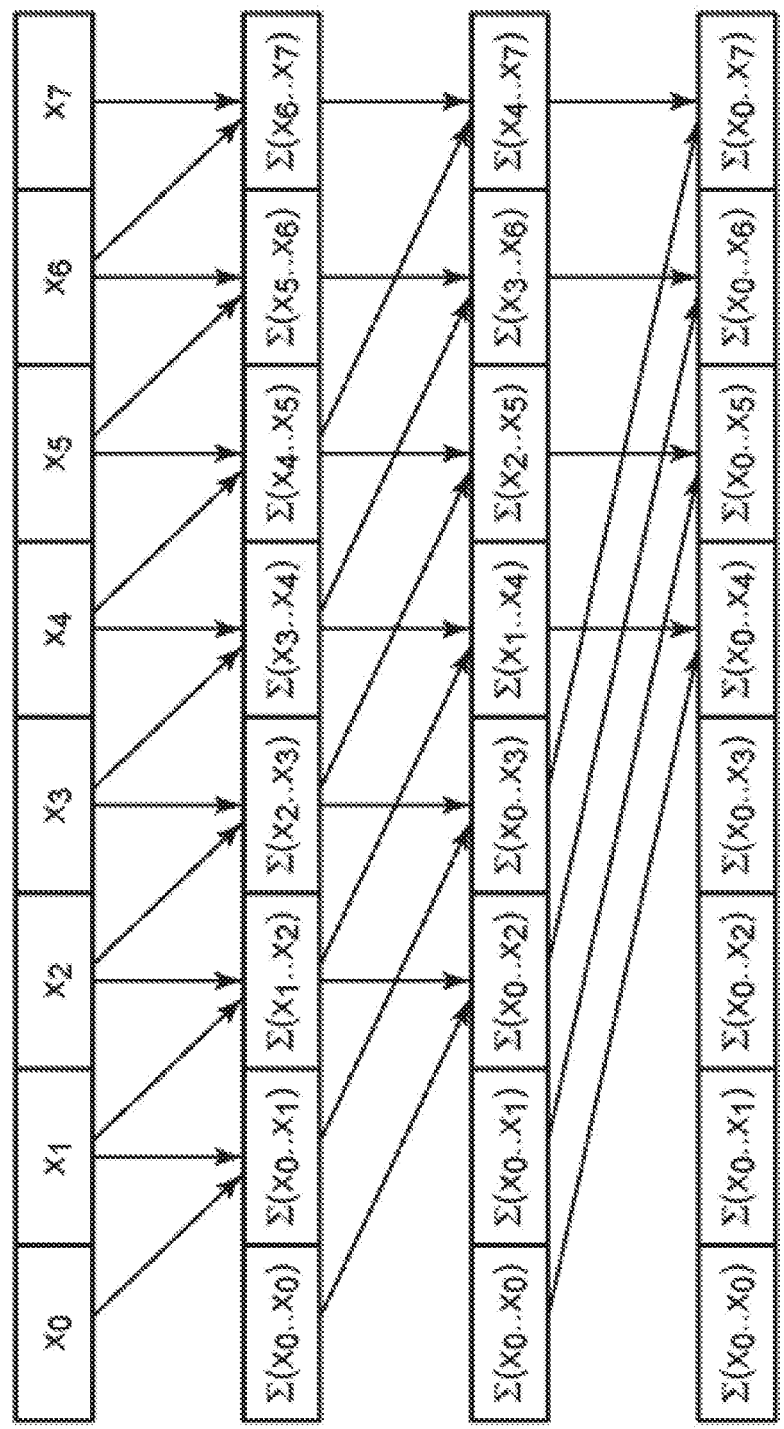
FIG. 12 is an explanatory diagram illustrating a state of parallel scan.

Herein, the scan is processing of acquiring a partial sum, where efficient parallel processing method is known. As the parallel processing method of the scan, parallel scan described in NPL 2 is possible, for example. In the parallel scan, as illustrated in FIG. 12, the respective data are added in parallel to data adjacent thereto. Then, in the parallel scan, the added data are added to data further adjacent thereto in a next step. In this way, redundant arithmetic operations in the parallel calculation of the partial sum are reduced, whereby the number of steps relating to the parallel calculation can be reduced.

Herein, the forward scan refers to a partial sum calculation according to the scanning order, and the reverse scan refers to a partial sum reverse to the scanning order.

Moreover, an inclusive scan $x_{i,inclusive}$ regarding an element x is represented by the following Equation (5).

[Math. 5]

$$x_{i,inclusive} = \sum_{k=0}^{i} x_k \qquad (5)$$

An exclusive scan $x_{i,exclusive}$ regarding the element x is represented by the following Equation (6).

[Math. 6]

$$\begin{matrix} 0 (i = 0) \\ x_{i,exclusive} = \sum_{k=0}^{i-1} x_k \, (i \neq 0) \end{matrix} \qquad (6)$$

Subsequently, the last coefficient cost calculation unit 1520 adds together a forward partial sum of $J_{i,cut}$ and a reverse partial sum of $J_{i,code}$, which are acquired in Step S202 (Step S203, corresponding to (c) in the explanatory diagram of FIG. 11). Herein, when attention is paid to (c) in FIG. 11, it is seen that a result of the addition is equal to Equation (3). The forward scan and the reverse scan are used as described above, whereby the RD cost of the individual last coefficient position candidates can be acquired in parallel.

As described above, the last coefficient cost calculation unit 1520 acquires a quantization forward partial sum of the cost at the time of not quantizing each data and a quantization reverse partial sum of the cost at the time of quantizing each data. Then, the last coefficient cost calculation unit 1520 adds together the quantization forward partial sum and the quantization reverse partial sum. Thereby, the last coefficient cost calculation unit 1520 achieves the parallel processing regarding the plurality of last coefficient position candidates while dispersing common processing between the respective last coefficient position candidates.

Finally, the last coefficient cost determination unit 1530 acquires an optimal last coefficient position.

Specifically, the last coefficient cost determination unit 1530 first acquires a minimum value among the RD cost of the respective last coefficient position candidates acquired by the last coefficient cost calculation unit 1520 (Step S204, corresponding to (d) in the explanatory diagram of FIG. 11). The last coefficient position candidate in which the RD cost becomes the minimum value becomes an optimal last coefficient position.

Herein, also in the minimum value calculation, the parallel processing method is similarly known. For example, the parallel reduction processing described in NPL 3 is possible. Like the parallel scan, also in the parallel reduction, adjacent data are exchanged with each other, which makes it possible to reduce the number of steps relating to the parallel processing.

Subsequently, when each coefficient position is located before the acquired optimal last coefficient position in the scanning order (NO in Step S205), the last coefficient cost determination unit 1530 proceeds to Step S206. When each coefficient position is located behind the acquired optimal last coefficient position in the scanning order (YES in Step S205), the last coefficient cost determination unit 1530 proceeds to Step S207 (Step S205).

When the coefficient position is located before the last coefficient position in the scanning order, the last coefficient cost determination unit 1530 sets the coefficient value to 0 (Step S206).

When the coefficient position is located behind the last coefficient position in the scanning order, the last coefficient cost determination unit 1530 outputs the coefficient value as it is (Step S207).

As described above, the last coefficient cost determination unit 1530 compares the cost of the respective data length candidates with one another hierarchically in parallel, thereby determines in parallel the data length candidates in which the cost becomes the minimum value.

[Explanation of Effects]

Next, effects of the first example embodiment will be described.

The last coefficient position optimization unit 1500 of this first example embodiment can reduce the number of steps relating to the processing from O(N) steps to O(log N) steps, and can accelerate the optimization processing for the last coefficient position. A reason for this is that the last coefficient position optimization unit 1500 is configured to be capable of efficiently performing the parallel processing regarding the respective coefficients by using the methods capable of achieving efficient parallel processing, the methods including the forward scan, the reverse scan, and the minimum value reduction.

Second Example Embodiment

[Explanation of Configuration]

Figure 13:
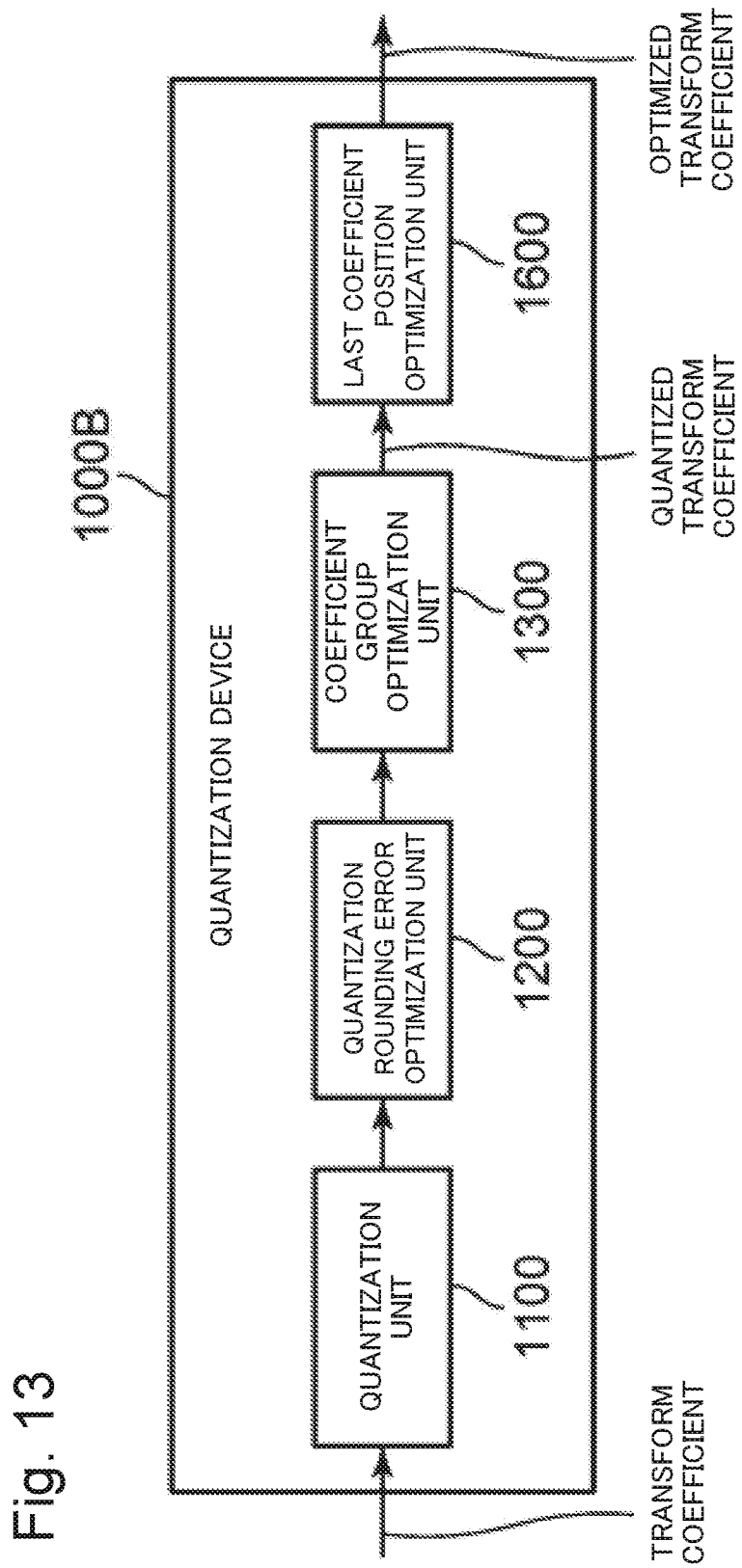
FIG. 13 is a block diagram illustrating a configuration of a quantization device 1000B of a second example embodiment of the present invention.

FIG. 13 is a block diagram illustrating a configuration example of a quantization device 1000B according to a second example embodiment of the present invention.

The illustrated quantization device 1000B has a similar configuration to that of the quantization device 1000 illustrated in FIG. 1 except that a last coefficient position optimization unit 1600 is used in place of the last coefficient position optimization unit 1400.

Figure 14:
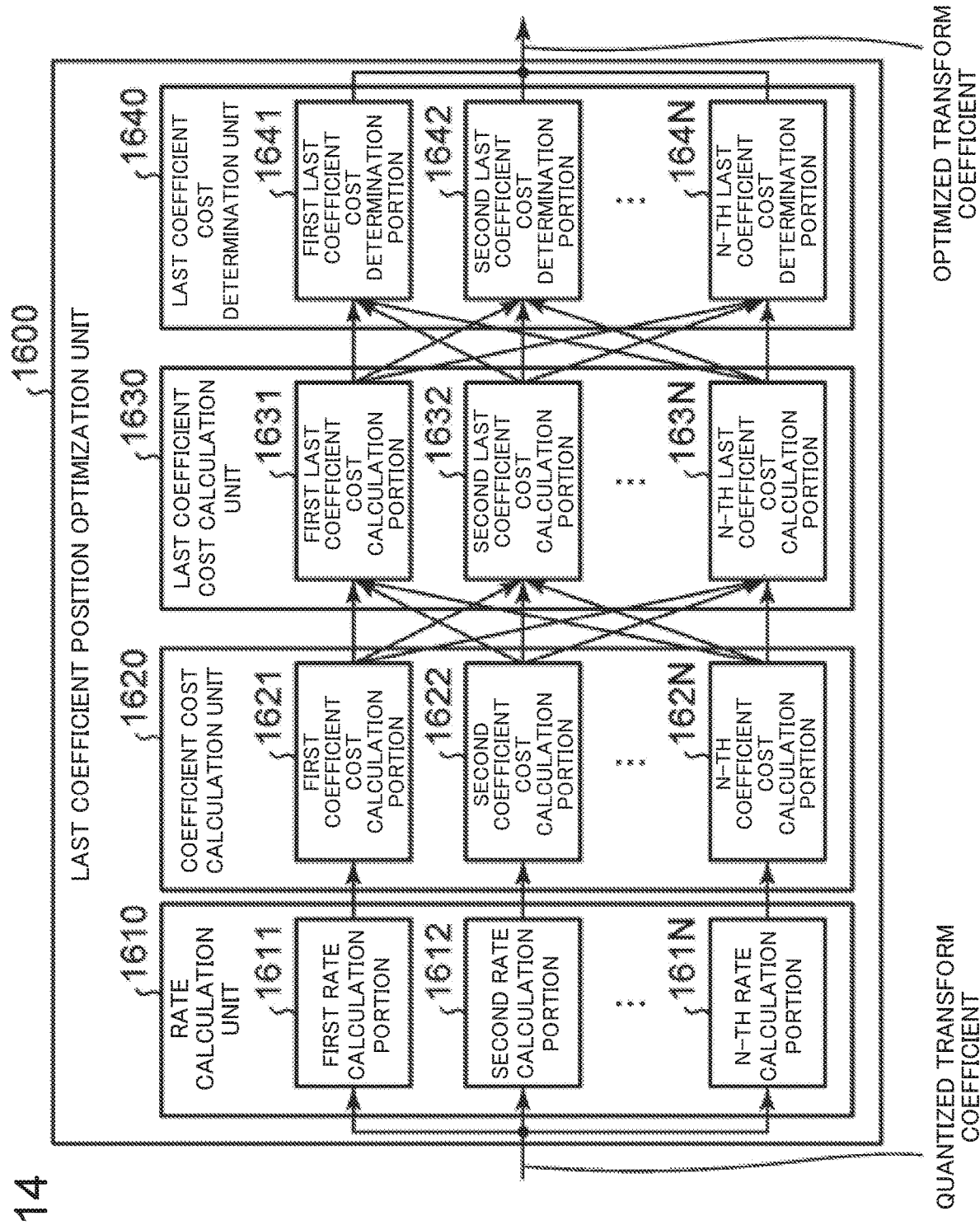
FIG. 14 is a block diagram illustrating a configuration of a last coefficient position optimization unit 1600 for use in the quantization device 1000B illustrated in FIG. 13.

FIG. 14 is a block diagram illustrating a configuration example of the last coefficient position optimization unit 1600 illustrated in FIG. 13.

As illustrated in FIG. 14, the last coefficient position optimization unit 1600 of this second example embodiment is composed of: a rate calculation unit 1610; a coefficient cost calculation unit 1620; a last coefficient cost calculation unit 1630; and a last coefficient cost determination unit 1640.

The last coefficient position optimization unit 1600 of this second example embodiment is different from the last coefficient position optimization unit 1500 of the above-described first example embodiment in that the rate calculation unit 1610 is included.

The rate calculation unit 1610 is composed of first to N-th rate calculation portions 1611, 1612, ..., 161N.

The rate calculation unit 1610 has a function to calculate more accurate rates in parallel in rate calculation required for the RD cost of the respective last coefficient position candidates while considering the dependence relationship between the coefficients.

Moreover, the rates of the respective last coefficient position candidates, which are acquired by the rate calculation unit 1610, are input to the last coefficient cost calculation unit 1630. Herein, the matter that the rates are more accurate than in the first example embodiment is derived from use of the approximation in the rate calculation of the last coefficient position optimization unit 1500 for the purpose of eliminating the dependence relationship between the coefficients.

Moreover, the last coefficient position optimization unit 1600 of this second example embodiment is different from the last coefficient position optimization unit 1500 of the above-described first example embodiment in that the last coefficient cost calculation unit 1630 has a function to add more accurate rates acquired by the rate calculation unit 1610 to the RD cost of the respective last coefficient position candidates.

Other configurations of the last coefficient position optimization unit 1600 are similar to those of the last coefficient position optimization unit 1500 of the first example embodiment.

In other words, the coefficient cost calculation unit 1620 is composed of first to N-th coefficient cost calculation portions 1621, 1622, ..., 162N. The last coefficient cost calculation unit 1630 is composed of first to N-th last coefficient cost calculation portions 1631, 1632, ..., 163N.

Hence, a combination of the rate calculation unit 1610, the coefficient cost calculation unit 1620 and the last coefficient cost calculation unit 1630 works as a cost calculation unit that calculates pieces of cost of the plurality of data length candidates in parallel while dispersing a common calculation.

The last coefficient cost determination unit 1640 is composed of first to N-th last coefficient cost determination portions 1641, 1642, ..., 164N.

The last coefficient cost determination unit 1640 works as a determination unit that determines in parallel a single data length candidate with minimum cost among a plurality of data length candidates, and acquires the optimal data length.

Hence, the last coefficient position optimization unit 1600 operates in parallel regarding the plurality of data length candidates.

[Explanation of Operations]

Hereinafter, an operation of the last coefficient position optimization unit 1600 of this second example embodiment will be described.

Figure 15:
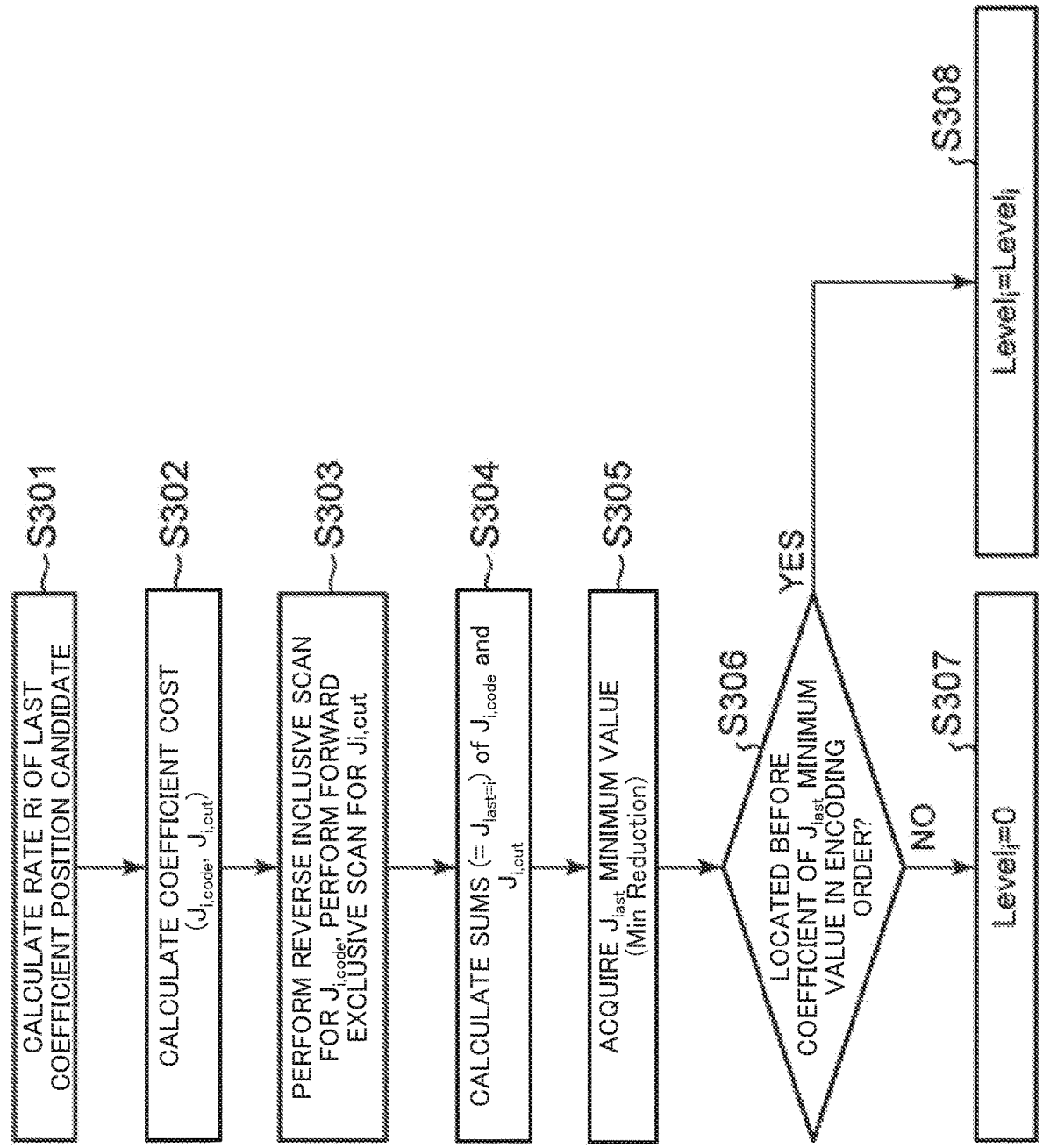
FIG. 15 is a flowchart illustrating an operation of the last coefficient position optimization unit 1600 of the second example embodiment of the present invention.

FIG. 15 is a flowchart illustrating the operation of the last coefficient position optimization unit 1600 of the second example embodiment.

Figure 10:
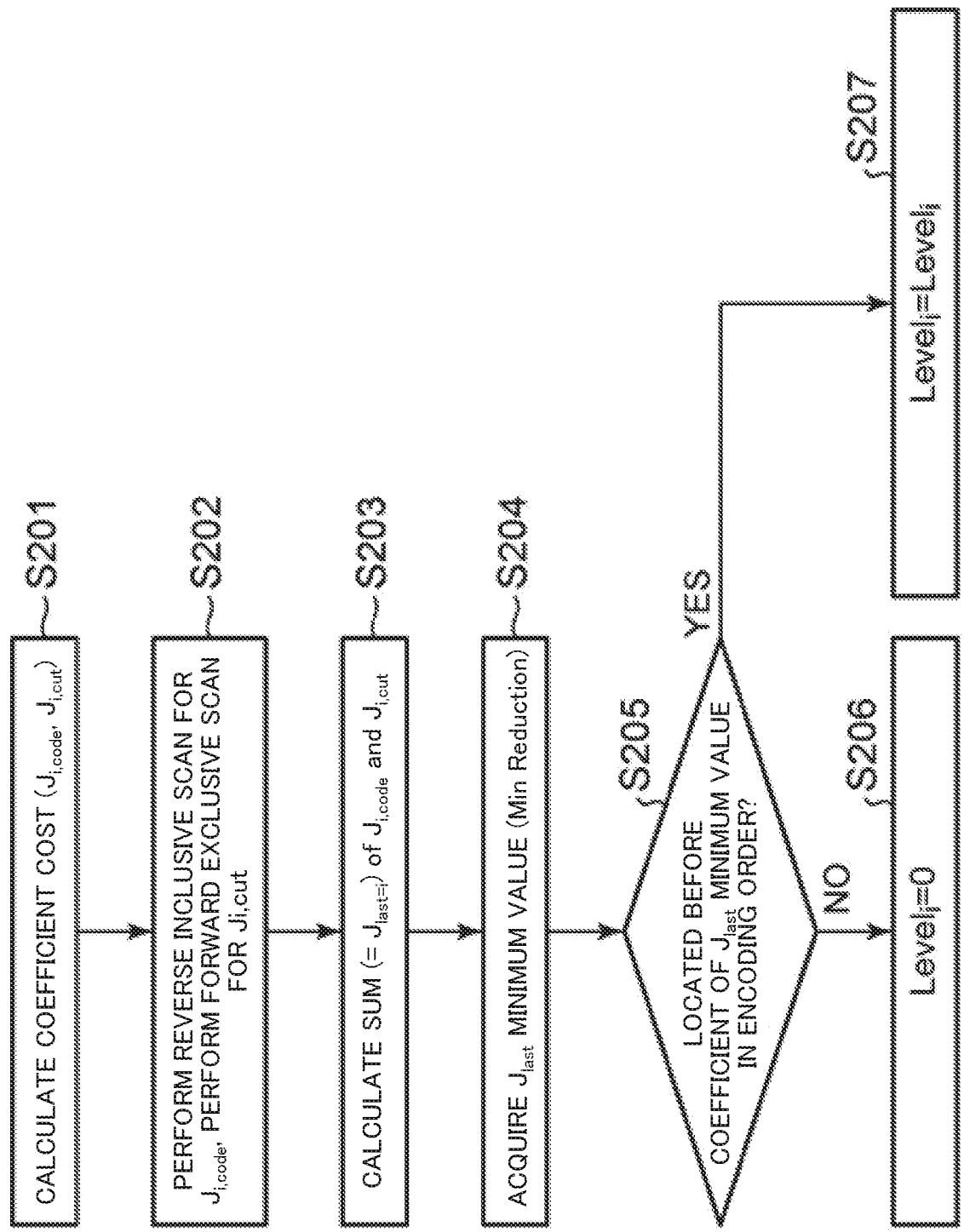
FIG. 10 is a flowchart illustrating an operation of the last coefficient position optimization unit 1500 of the first example embodiment of the present invention.

In FIG. 15, pieces of processing in Steps S302 to S308, excluding Step S301, are respectively similar to Steps S201 to S207 illustrated in FIG. 10.

Hereinafter, only different points from those in FIG. 9 will be described in order to simplify the explanation (to avoid a repeated explanation).

The rate calculation unit 1610 calculates the rates of the respective last coefficient position candidates in parallel in consideration of the dependence relationship between the coefficients (Step S301).

Herein, as each of the rates, the number of bins, which represents the number of bits before being input to the CABAC, for example, is possible like the first example embodiment. Meanwhile, the second example embodiment is different from the first example embodiment in that the approximation is not performed in the calculation of the number of bins for the syntax having dependency between the coefficients. The parallel processing method of the calculation of the number of bins will be described later.

The last coefficient cost calculation unit 1630 adds the RD cost which encodes the respective coefficients and are acquired by the coefficient cost calculation unit 1620, the RD cost which does not encode the respective coefficients, and the rates of the last coefficient position candidates, which are acquired by the rate calculation unit 1610, to one another (Step S304).

Hereinafter, referring to FIG. 16, the parallel processing method of the rate calculation will be described while taking as an example coeff_abs_level_greater1_flag that is one of such syntaxes regarding the transform coefficient encoding of HEVC.

coeff_abs_level_greater1_flag is a syntax required for each coefficient group. Moreover, regarding the coefficients in the coefficient group, when absolute values of the coefficients are greater than 1, coeff_abs_level_greater1_flag becomes "1", and when the absolute values of the coefficients are smaller than 1, coeff_abs_level_greater1_flag becomes "0". In addition, coeff_abs_level_greater1_flag can store eight non-zero coefficients at most in the scanning order. Hence, the coefficients storable in coeff_abs_level_greater1_flag differ depending on the last coefficient positions, and accordingly, the parallel processing is difficult.

In the rate calculation unit 1610 of this example embodiment, the parallel processing is performed as follows for coeff_abs_level_greater1_flag that is as described above, for example.

Figure 16:
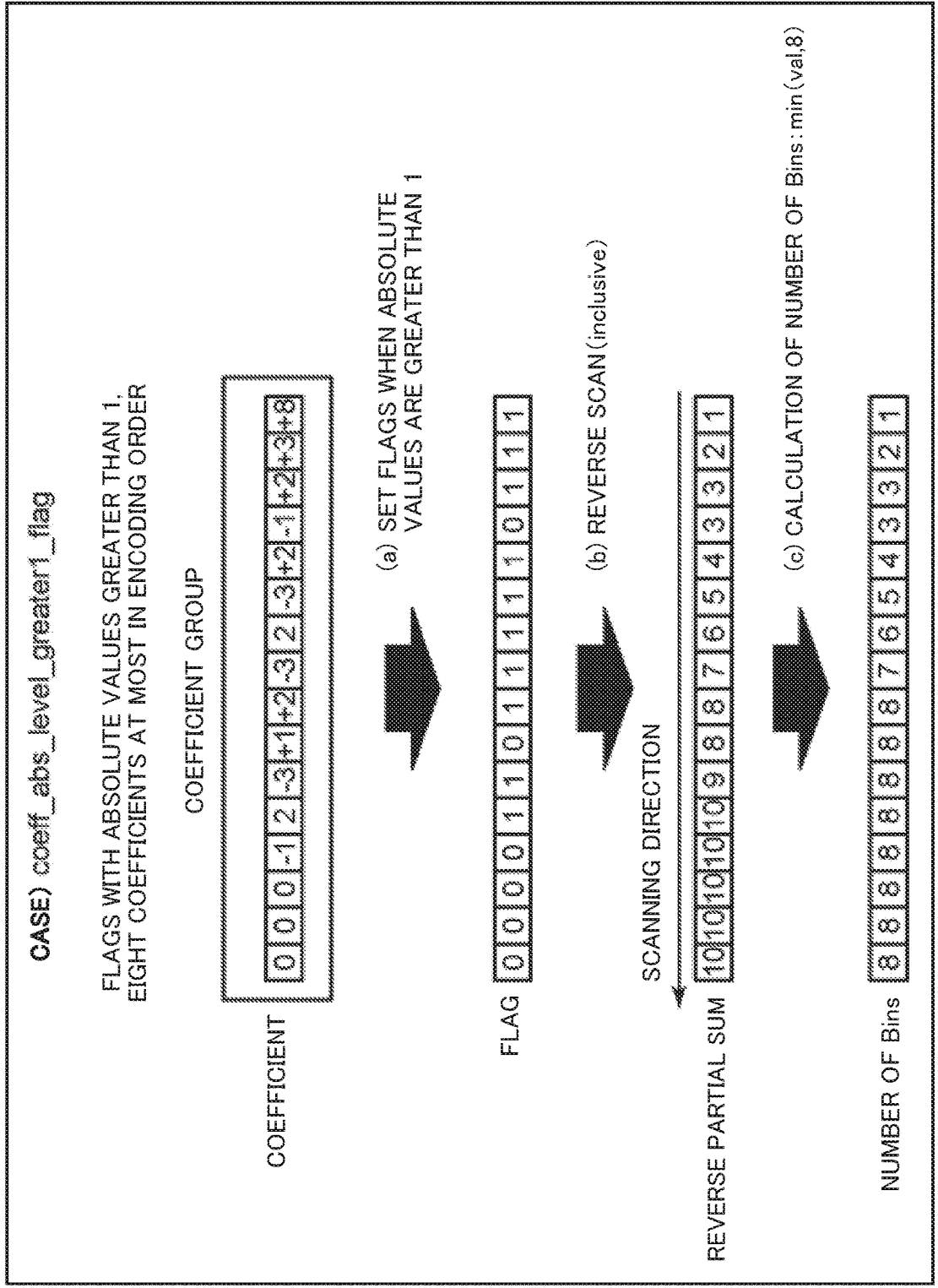
FIG. 16 is an explanatory diagram illustrating an example of rate calculation by the second example embodiment of the present invention.

First, for input coefficients, flags are set when absolute values thereof are greater than 1 (corresponding to (a) in FIG. 16).

Subsequently, regarding the flags in which the absolute values are greater than 1, the reverse inclusive scan to the scanning order (encoding order) are implemented (corresponding to (b) in FIG. 16).

Finally, the respective inverse partial sums are updated by smaller values between values thereof and 8 (corresponding to (c) in FIG. 16).

As described above, the reverse scan is implemented for the flags representing that the absolute values thereof are greater than 1, thereby, it is possible to calculate in parallel the number of bins relating to the encoding of coeff_abs_level_greater1_flag of the respective last position candidates.

Note that, though only coeff_abs_level_greater1_flag has been described herein, it is also possible to perform the parallel processing for the number of bins of each of other syntaxes by a similar method.

As described above, in the processing in which information on the coefficients which satisfy a specific condition in the respective data length candidates is required in the calculation of the compression ratio cost, the rate calculation unit 1610 acquires flags representing that the coefficients which satisfy the above-described specific condition are present. The cost calculation units (1620, 1630) perform the parallel processing for the above-described flags.

In other words, the rate calculation unit 1610 calculates the partial sums for the above-described flags, and this is processing that requires the number of coefficients which satisfy the specific condition in the respective data length candidates in the calculation of the compression ratio cost. As described above, by calculating the partial sums for the above-described flags, the cost calculation units (1620, 1630) achieve the parallel processing.

[Explanation of Effects]

The last coefficient position optimization unit 1600 of this second example embodiment can calculate more accurate rates without lowering the parallel processing efficiency, and can achieve higher image quality or compression ratio. A reason for this is that the last coefficient position optimization unit 1600 is configured to be capable of performing the parallel processing for the respective last coefficient position candidates by using the parallel processing method such as the parallel scan while holding the dependence relationship between the coefficients in the rate calculation.

[Examples]

Next, an operation of a mode for embodying the present invention will be described by using a specific example.

Figure 17:
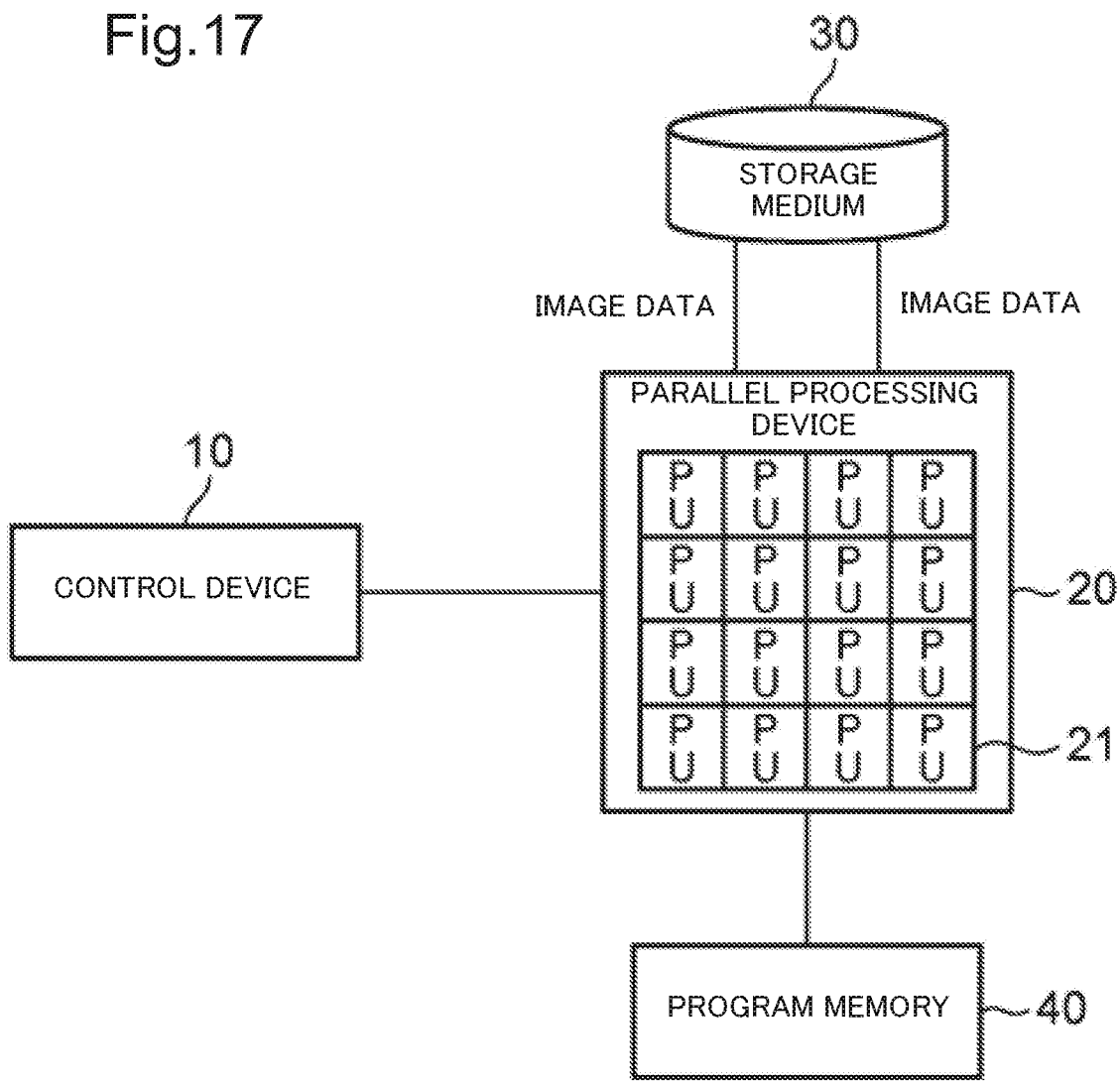
FIG. 17 is a block diagram illustrating a configuration example of an information processing device capable of achieving a function of the quantization device according to the examples of the present invention.

An information processing device illustrated in FIG. 17 includes: a control device 10; a parallel processing device 20; a storage medium 30 for storing image data; and a program memory 40.

The parallel processing device 20 is composed of a plurality of processing units (PUs) 21. In the illustrated example, the parallel processing device 20 is composed of sixteen pieces of the processing units 21. However, it is a matter of course that the number of processing units 21 is not limited to this.

In the information processing device illustrated in FIG. 17, programs for achieving the functions of the respective blocks illustrated in FIG. 8 and FIG. 13 are stored in the program memory 40. Then, in accordance with the program instructed to be executed by the control device 10 and stored in the program memory 40, the parallel processing device 20 executes the processing in parallel by the respective processing units 21, thereby achieves the functions of the quantization devices 1000A and 1000B illustrated in FIG. 8 and FIG. 13.

Herein, for example, the control device 10 may be a central processing unit (CPU), and a graphic processing unit (GPU) can be used as the parallel processing device 20; however, it is a matter of course that the control device 10 and the parallel processing device 20 are not limited to these.

Next, the matter that the information processing device illustrated in FIG. 17 "executes the processing in parallel" will be described by taking as an example the case where the last coefficient position optimization unit 1500 of the first example embodiment illustrated in FIG. 9 executes the processing.

First, the control device 10 controls the operation of the parallel processing device 20, thereby achieves a first step to be executed by the coefficient cost calculation unit 1510. At the time of executing this first step, the control device 10 executes the processing, which is to be implemented by the n-th coefficient cost calculation portion 151n, by using one or more PUs 21. Herein, 1≤n≤N is established. By executing this operation by using the plurality of PUs 21 of the parallel processing device 20, the parallel operations of the respective blocks of the first to N-th coefficient cost calculation portions 151 to 151N can be achieved.

After the execution (of the first step) by the coefficient cost calculation unit 1510 is completed, then in a next second step, the control device 10 achieves the operation of the last coefficient cost calculation unit 1520 by similarly controlling the parallel processing device 20. In other words, at the time of executing this second step, the control device 10 executes the processing, which is to be implemented by the n-th last coefficient cost calculation portion 152n, by using one or more PUs 21. By executing this operation by using the plurality of PUs 21 of the parallel processing device 20, the parallel operations of the respective blocks of the first to N-th last coefficient cost calculation portions 1521 to 152N can be achieved.

After the execution (of the second step) by the last coefficient cost calculation unit 1520 is completed, then in a next third step, the control device 10 achieves the last coefficient cost determination unit 1530 by similarly controlling the parallel processing device 20. In other words, at the time of executing this third step, the control device 10 executes the processing, which is to be implemented by the n-th last coefficient cost determination portion 153*n*, by using one or more PUs 21. By executing this operation by using the plurality of PUs 21 of the parallel processing device 20, the parallel operations of the respective blocks of the first to N-th last coefficient cost determination portions 1531 to 153N can be achieved.

Moreover, in the above, illustrated is an example where the control device 10 controls the parallel processing device 20 in the respective first, second, and third steps; however, the control by the control device 10 is not limited to this, and the control device 10 may instruct the parallel processing device 20 by previously integrating all the steps.

In this example, a general technology can be used for arrangement of the processing to the PUs 21, communication between the PUs 21, and the like at this time. Note that, for example, the communication between the PUs 21 refers to communication from the upstream calculation unit (the PU that executes the upstream calculation) to a plurality of the calculation units in the next step, by straddling over the steps (the plurality of PUs that execute the calculation in the next step).

Note that, in the above-described example embodiments, the last coefficient position optimization units 1500 and 1600 have been described so as to correspond to the last coefficient position optimization unit 1400 of NPL 1; however, the present invention is not limited to this. For example, the last coefficient position optimization unit of the present invention is also capable of corresponding to the last coefficient position determination unit 230 of PTL 1 and the last coefficient position determination unit 360 of PTL 2.

Note that the present invention is not directly limited to the above-described example embodiments, and in an implementation phase, components thereof can be modified and embodied within the scope without departing from the spirit thereof. Moreover, a variety of inventions can be formed by appropriate combinations of the plurality of components.

Note that the respective units of the data processing device just need to be achieved by combinations of hardware and software. In a mode in which hardware and software are combined with each other, a quantization program is developed on a random access memory (RAM), and on the basis of the quantization program, the control device 10 such as a central processing unit (CPU) operates the hardware of the parallel processing device 20 such as the graphic processing unit (GPU), thereby achieving the respective units as a variety of means. Moreover, the quantization program may be recorded in a recording medium and distributed. The quantization program recorded in the recording medium is read on the memory via wire or radio or via the recording medium itself, and operates the control units (control device 10, parallel processing device 20) and the like. Note that examples of the recording medium include an optical disk, a magnetic disk, a semiconductor memory device, a hard disk, and the like.

The above-described example embodiments will be expressed by another way as follows. A computer operated as the data processing device is operated as a combination of the coefficient cost calculation unit 1510, the last coefficient cost calculation unit 1520, and the last coefficient cost determination unit 1530 on the basis of the quantization program developed on the RAM. Alternatively, the computer is operated as a combination of the rate calculation unit 1610, the coefficient cost calculation unit 1620, the last coefficient cost calculation unit 1630, and the last coefficient cost determination unit 1640. In this way, it is possible to achieve the above-described embodiments.

Moreover, the specific configuration of the present invention is not limited to the above-mentioned example embodiments, and alterations within the scope without departing from the spirit of this invention are also incorporated in this invention.

The description has been given above on the invention of the present application with reference to the example embodiments; however, the invention of the present application is not limited to the above-described embodiments. The configuration and details of the invention of the present application can be subjected to a variety of changes understandable by those skilled in the art within the scope of the invention of the present application.

Some or all of the above-described example embodiments can also be described as in the following supplementary notes; however, are not limited to the following.

(Supplementary Note 1)

A quantization device that performs quantization processing for an image, the quantization device comprising:

processing means for calculating, for a plurality of data lengths, cost for which a degradation of image quality due to compression of the image and a compression ratio of the image are taken into consideration, wherein a processing of calculating the cost is a processing partially performed in common among the plurality of data lengths, and the processing means operates in parallel regarding the plurality of data lengths, and includes:

cost calculating means for executing the processing performed in common among the plurality of data lengths in parallel while dispersing the processing;

determining means for acquiring, as an optimal data length, a single data length in which the cost becomes minimum among the plurality of data lengths.

(Supplementary Note 2)

The quantization device according to supplementary note 1, wherein the cost calculating means acquires a quantization forward partial sum of the cost at a time of not quantizing each piece of data and a quantization reverse partial sum of the cost at a time of quantizing each piece of data, adds together the quantization forward partial sum and the quantization reverse partial sum, and thereby calculates in parallel the cost for the plurality of data lengths.

(Supplementary Note 3)

The quantization device according to supplementary note 1 or 2, wherein the determining means compares the cost for the plurality of data lengths with one another hierarchically in parallel, and thereby determines a data length in which the cost becomes a minimum value.

(Supplementary Note 4)

The quantization device according to any one of supplementary notes 1 to 3, further comprising rate calculating means for individually acquiring flags for the plurality of data lengths, the flags each representing that a pixel satisfying a specific condition is present, executing parallel processing for the flags, and thereby calculating a compression ratio of the image, which is necessary to calculate the cost.

(Supplementary Note 5) The quantization device according to supplementary note 4, wherein the rate calculating means calculates a partial sum of the flags in parallel.

(Supplementary Note 6)

The quantization device according to any one of supplementary notes 1 to 5, wherein the quantization processing is rate distortion optimized quantization (RDOQ) processing in video encoding, the cost calculating means calculates, as the cost of each data length, cost of a last coefficient position to be encoded last among input coefficients, the determining means determines, as the optimal data length, a last coefficient position in which the cost becomes minimum from among a plurality of calculated last coefficient positions, and the processing means operates in parallel regarding the plurality of last coefficient positions.

(Supplementary Note 7)

A quantization method of implementing quantization processing for an image by a quantization device, the quantization method comprising:

calculating, for a plurality of data lengths, quantization cost for which a degradation of image quality due to compression of the image and a compression ratio of the image are taken into consideration, wherein the calculating the cost including a processing partially performed in common among the plurality of data lengths, and the calculating the cost comprising:

executing the processing performed in common among the plurality of data lengths in parallel while dispersing the processing, and outputting, as an optimal data length, a single data length in which the cost becomes minimum among the plurality of data lengths.

(Supplementary Note 8)

The quantization method according to supplementary note 7, further comprising acquiring a quantization forward partial sum of cost at a time of not quantizing each piece of data and a quantization reverse partial sum of cost at a time of quantizing each piece of data, adding together the quantization forward partial sum and the quantization reverse partial sum, and thereby, calculating in parallel the cost for the plurality of data lengths.

(Supplementary Note 9)

The quantization method according to supplementary note 7 or 8, further comprising comparing cost for the plurality of data lengths with one another hierarchically in parallel, and thereby, determining in parallel a data length in which the cost becomes a minimum value.

(Supplementary Note 10)

The quantization method according to supplementary note 7 or 8, further comprising acquiring flags each representing that a pixel satisfying a specific condition is present individually for the plurality of data lengths, executing parallel processing for the flags, and thereby, calculating a compression ratio of the image.

(Supplementary Note 11)

The quantization method according to supplementary note 10, further comprising calculating in parallel a partial sum of the flags.

(Supplementary Note 12)

The quantization method according to any one of supplementary notes 7 to 11, wherein the quantization processing is rate distortion optimized quantization (RDOQ) processing in video encoding, cost of a last coefficient position to be encoded last among input coefficients is calculated in parallel, and a last coefficient position in which the cost becomes minimum is determined as the optimal data length, from among the plurality of last coefficient positions.

(Supplementary Note 13)

A non-transitory recording medium that records a quantization program causing a computer to perform quantization processing for an image, the quantization program causing the computer to execute:

processing of calculating, for a plurality of data lengths, cost for which a degradation of image quality due to compression of the image and a compression ratio of the image are taken into consideration, wherein the processing of calculating the cost includes a processing partially performed in common among the plurality of data lengths, and includes cost calculation processing of executing the processing performed in common among the plurality of data lengths in parallel while dispersing the processing; and determination processing of acquiring, as an optimal data length, a single data length in which the cost becomes minimum among the plurality of data lengths.

The present invention has been described above while taking the above-mentioned example embodiments as model examples. However, the present invention is not limited to the above-mentioned example embodiments. That is to say, a variety of modes understandable by those skilled in the art can be applied to the above-mentioned example embodiments within the scope of the present invention.

This application claims priority based upon Japanese Patent Application No. 2017-008303 filed on Jan. 20, 2017, the entire disclosure of which is incorporated herein by reference.

REFERENCE SIGNS LIST

10 Control device
20 Parallel processing device
21 Processing unit (PU)
30 Storage medium
40 Program memory
200 Quantization device
210 Scaling unit
211 First scaling portion
212 Second scaling portion
21N N-th scaling portion
220 Coefficient absolute value determination unit
221 First coefficient absolute value determination portion
222 Second coefficient absolute value determination portion
22N N-th coefficient absolute value determination portion
230 Last coefficient position determination unit
300 Quantization device
310 Control unit
320 Scaling unit
330 Coefficient optimization unit
340 Storage unit
350 Coefficient group optimization unit
360 Last coefficient position determination unit
370 Correction value calculation unit
380 Determination unit
1000, 1000A, 1000B Quantization device
1100 Quantization unit
1200 Quantization rounding error optimization unit
1300 Coefficient group optimization unit
1400 Last coefficient position optimization unit
1410 Coefficient cost calculation unit
1420 Last coefficient cost calculation unit
1430 Last coefficient cost determination unit
1500 Last coefficient position optimization unit
1510 Coefficient cost calculation unit
1511 First coefficient cost calculation portion
1512 Second coefficient cost calculation portion 151N N-th coefficient cost calculation portion
1520 Last coefficient cost calculation unit
1521 First last coefficient cost calculation portion
1522 Second last coefficient cost calculation portion
152N N-th last coefficient cost calculation portion
1530 Last coefficient cost determination unit
1531 First last coefficient cost determination portion
1532 Second last coefficient cost determination portion
153N N-th last coefficient cost determination portion
1600 Last coefficient position optimization unit
1610 Rate calculation unit
1611 First rate calculation portion
1612 Second rate calculation portion
161N N-th rate calculation portion
1620 Coefficient cost calculation unit
1621 First coefficient cost calculation portion
1622 Second coefficient cost calculation portion
162N N-th coefficient cost calculation portion
1630 Last coefficient cost calculation unit
1631 First last coefficient cost calculation portion
1632 Second last coefficient cost calculation portion
163N N-th last coefficient cost calculation portion
1640 Last coefficient cost determination unit
1641 First last coefficient cost determination portion
1642 Second last coefficient cost determination portion
164N N-th last coefficient cost determination portion

What is claimed is:

1. A quantization device comprising:
at least one memory configured to store instructions; and
at least one processor configured to execute the instructions to perform:
quantization processing for an image, the quantization processing including:
cost calculation processing of calculating, for a plurality of data length candidates, first costs for each of which a degradation of image quality due to compression of the image and a compression ratio of the image are taken into consideration, wherein
the cost calculation processing is common processing partially performed among the plurality of data length candidates, and
the at least one processor is configured to:
operate in parallel regarding the plurality of data length candidates, and perform;
executing the common processing performed among the plurality of data length candidates in parallel; and
acquiring, as an optimal data length, a single data length for which a minimum cost is calculated among the first costs for the plurality of data length candidates;
calculate second costs for pieces of data in a case of not encoding the pieces of data in parallel, the pieces of data being generated in the compression;
calculate third costs for the pieces of data in a case of not encoding the pieces of data in parallel;
calculate, as the first sums, total sums in parallel, wherein
each of the total sums is a summation of a quantization forward partial sum and a quantization reverse partial sum,
the quantization forward partial sum is a sum of the second costs for a first part of the pieces of data, the first part being from a first piece to a candidate piece whose position corresponds to a data length candidate in the plurality of data length candidates, and
the quantization reverse partial sum is a sum of the third costs for a second part of the pieces of data, the second part being from a piece next to the candidate piece next to the candidate piece to a last piece.

2. The quantization device according to claim 1, wherein the at least one processor is configured to compare the first costs for the plurality of data length candidates with one another in parallel, and determine a data length for which a minimum cost is calculated.

3. The quantization device according to claim 1, wherein the at least one processor is further configured to perform:
individually acquiring flags for the plurality of data length, each of the flags representing whether a pixel satisfies a predetermined condition, executing parallel processing for the flags, and calculating a compression ratio of the image to calculate the first costs.

4. The quantization device according to claim 3, wherein the at least one processor is configured to calculate a partial sum of the flags in parallel.

5. The quantization device according to claim 1, wherein the quantization processing is rate distortion optimized quantization (RDOQ) processing in video encoding,
the at least one processor is configured to:
operate in parallel regarding the plurality of last coefficient position candidates when performing processing of:
calculating, as the first costs for the plurality of data length candidates, fourth costs for a plurality of last coefficient position candidates to be encoded last among input coefficients, and
determining, as a position corresponding to the optimal data length, a last coefficient position for which a minimum cost is calculated among the first costs calculated for the plurality of last coefficient position candidates.

6. A quantization method, performed by a quantization device, the quantization method comprising:
cost calculating, for a plurality of data length candidates, first costs for each of which a degradation of image quality due to compression of and image and a compression ratio of the image are taken into consideration, wherein
the cost calculating is a common processing partially performed among the plurality of data length candidates, and the calculating the first costs comprising:
executing the common processing performed among the plurality of data length candidates in parallel, and
outputting, as an optimal data length, a single data length for which a minimum cost is calculated among the first costs for the plurality of data length candidates;
calculating second costs for pieces of data in a case of not encoding the pieces of data in parallel, the pieces of data being generated in the compression;
calculating third costs for the pieces of data in a case of not encoding the pieces of data in parallel,
calculating, as the first sums, total sums in parallel, wherein
each of the total sums is a summation of a quantization forward partial sum and a quantization reverse partials sum,
the quantization forward partial sum is a sum of the second costs for a first part of the pieces of data, the first part being from a first piece to a candidate pieces whose position corresponds to a data length candidate in the plurality of data length candidates, and the quantization reverse partial sum is a sum of the third costs for a second part of the pieces of data, the second part being from a piece next to the candidate piece to a last piece.

7. The quantization method according to claim 6, further comprising comparing the first costs for the plurality of data length candidates with one another in parallel, and determining a data length for which a minimum costs is calculated.

8. The quantization method according to claim 6, further comprising individually acquiring flags for the plurality of data length candidates, each of the flags representing whether a pixel satisfies a predetermined condition, executing parallel processing for the flags, and calculating a compression ratio of the image.

9. The quantization method according to claim 8, further comprising calculating in parallel a partial sum of the flags.

10. The quantization method according to claim 6, wherein
the quantization processing is rate distortion optimized quantization (RDOQ) processing in video encoding, and
wherein the quantization method further comprises:
operating in parallel regarding the plurality of last coefficient position candidates;
calculating, as the first costs for the plurality of data length candidates, fourth costs for a plurality of last coefficient position candidates to be encoded last among input coefficients in parallel, and
determining, as a position corresponding to the optimal data length, a last coefficient position for which a minimum cost is calculated among the first costs calculated for the plurality of last coefficient position candidates.

11. A non-transitory recording medium that stores a quantization program, when executed by a processor, causes the processor to:
perform cost calculation processing of calculating, for a plurality of data length candidates, first costs for each of which a degradation of image quality due to compression of the image and a compression ratio of the image are taken into consideration, wherein
the cost calculation processing is common processing partially performed among the plurality of data length candidates;
execute the common processing performed among the plurality of data length candidates in parallel;
acquired, as an optimal data length, a single data length for which a minimum cost is calculated among the first costs for the plurality of data length candidates;
calculating second costs for pieces of data in a case of not encoding the pieces of data in parallel, the pieces of data being generated in the compression;
calculating third costs for the pieces of data in a case of not encoding the pieces of data in parallel,
calculating, as the first sums, total sums in parallel, wherein
each of the total sums is a summation of a quantization forward partial sum and a quantization reverse partials sum,
the quantization forward partial sum is a sum of the second costs for a first part of the pieces of data, the first part being from a first piece to a candidate pieces whose position corresponds to a data length candidate in the plurality of data length candidates, and
the quantization reverse partial sum is a sum of the third costs for a second part of the pieces of data, the second part being from a piece next to the candidate piece to a last piece.

* * * * *